US007813900B2

(12) United States Patent
Takeda et al.

(10) Patent No.: US 7,813,900 B2
(45) Date of Patent: Oct. 12, 2010

(54) DISPLACEMENT DETECTION METHOD, DISPLACEMENT DETECTION DEVICE, DISPLACEMENT DETECTION PROGRAM, PHASE SINGULARITY MATCHING METHOD AND PHASE SINGULARITY MATCHING PROGRAM

(75) Inventors: Mitsuo Takeda, Chofu (JP); Wei Wang, Edinburgh (GB); Tomoaki Yokozeki, Matsuyama (JP); Reika Ishijima, Kawasaki (JP); Yu Qiao, Kashiwa (JP)

(73) Assignee: National University Corporation the University of Electro-Communications, Tokyo (JP)

( * ) Notice: Subject to any disclaimer, the term of this patent is extended or adjusted under 35 U.S.C. 154(b) by 217 days.

(21) Appl. No.: 12/162,370

(22) PCT Filed: Jan. 24, 2007

(86) PCT No.: PCT/JP2007/051095

§ 371 (c)(1),
(2), (4) Date: Jul. 28, 2008

(87) PCT Pub. No.: WO2007/088759

PCT Pub. Date: Aug. 9, 2007

(65) Prior Publication Data
US 2009/0037137 A1 Feb. 5, 2009

(30) Foreign Application Priority Data
Feb. 1, 2006 (JP) .............................. 2006-024846
Nov. 8, 2006 (JP) .............................. 2006-303238

(51) Int. Cl.
*G01V 9/00* (2006.01)
(52) U.S. Cl. ..................................... 702/197; 702/150

(58) Field of Classification Search ................. 702/150, 702/189
See application file for complete search history.

(56) References Cited

U.S. PATENT DOCUMENTS

| | | | | |
|---|---|---|---|---|
| 5,118,935 A | * | 6/1992 | Wertheimer et al. | ..... 250/237 R |
| 7,539,354 B2 | * | 5/2009 | Hardy et al. | ................. 382/276 |
| 7,552,120 B2 | * | 6/2009 | Essafi et al. | ......................... 1/1 |
| 2002/0042685 A1 | * | 4/2002 | Balan et al. | .................... 702/75 |
| 2002/0076116 A1 | * | 6/2002 | Eschbach | ..................... 382/260 |
| 2002/0135777 A1 | * | 9/2002 | Ge | ............................. 356/511 |
| 2003/0016871 A1 | | 1/2003 | Shinagawa et al. | |
| 2006/0036409 A1 | * | 2/2006 | Yamaguchi et al. | .......... 702/189 |
| 2007/0219745 A1 | * | 9/2007 | Takeda et al. | ................ 702/167 |

FOREIGN PATENT DOCUMENTS

| | | |
|---|---|---|
| JP | 3035654 | 5/1998 |
| JP | 2002-171395 | 6/2002 |
| JP | 2002-190020 | 7/2002 |

OTHER PUBLICATIONS

Gbur, "Phase singularities and coherence vortices in linear optical systems", Optics Communications 259 (2006) 428-435.*

(Continued)

*Primary Examiner*—Jonathan C. Teixeira Moffat
(74) *Attorney, Agent, or Firm*—IPUSA, PLLC

(57) ABSTRACT

A displacement detection method detects a displacement from phase singularities before and after the displacement, by specifying the phase singularities based on predetermined elements by acquiring the elements from a phase structure of the phase singularities, and detecting positions of the phase singularities after the displacement based on the elements acquired by specifying of the phase singularity.

20 Claims, 34 Drawing Sheets

OTHER PUBLICATIONS

Kieran G. Larkin et al; Natural Demodulation of two-dimensional fringe patterns. I. General background of the spiral phase quadrature transform; Aug. 2001; p. 1862-1870.

Yokozeki et al: Nanometric in-plane displacement measurement using phase singularities in the Riesz-transform analytic singnals of speckle patterns; Nov. 23, 2005; p. 702-703.

* cited by examiner

FIG.7
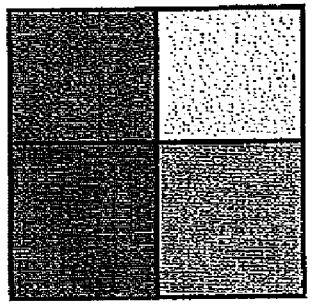
(C)
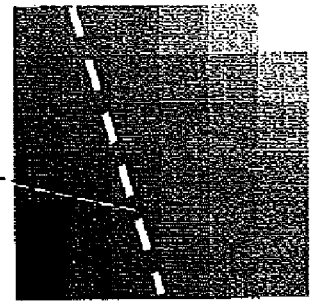
(F)
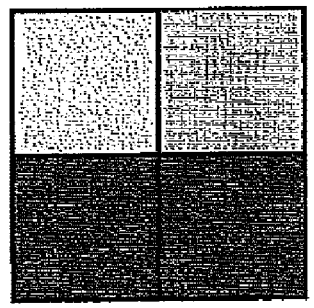
(B)
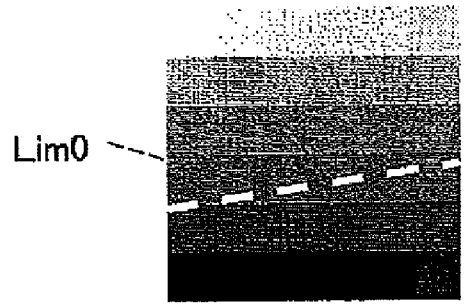
(E)
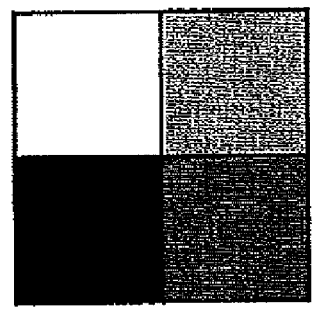
(A)
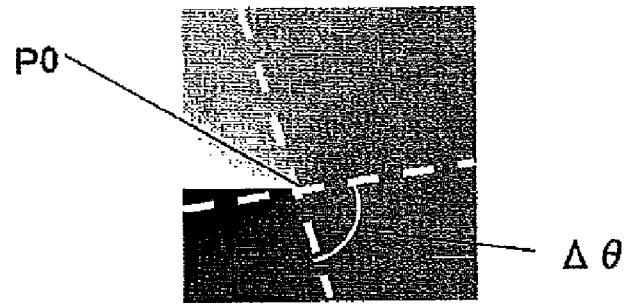
(D)

FIG.13
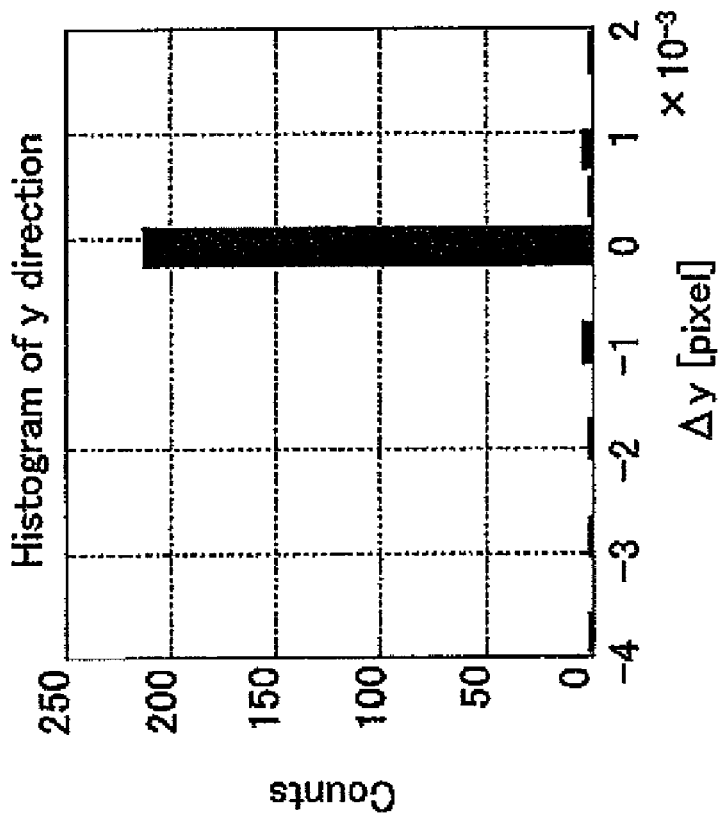
(B)
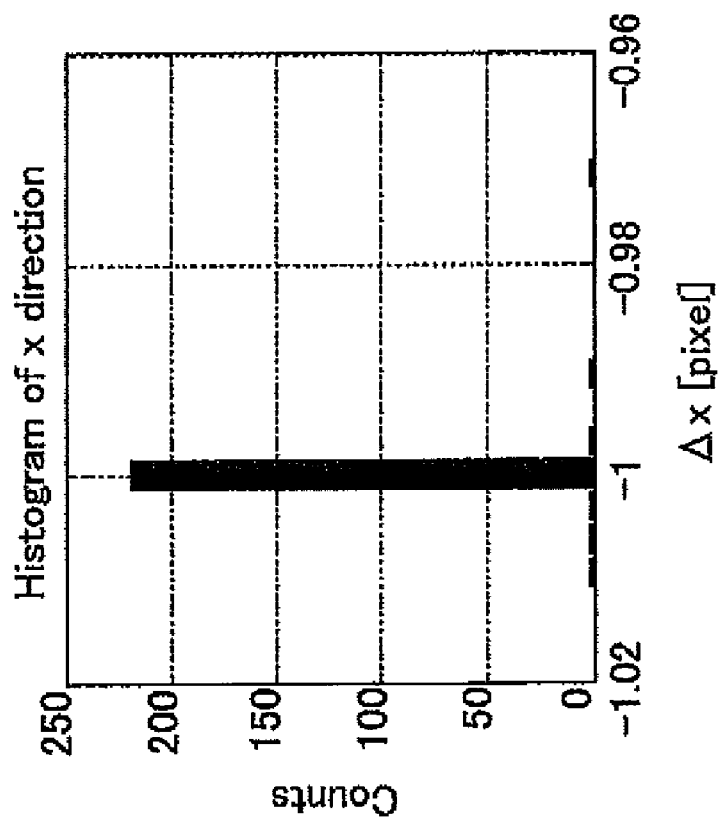
(A)

FIG.15
(A)
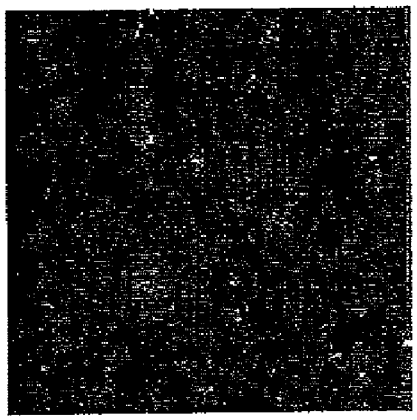
(D)
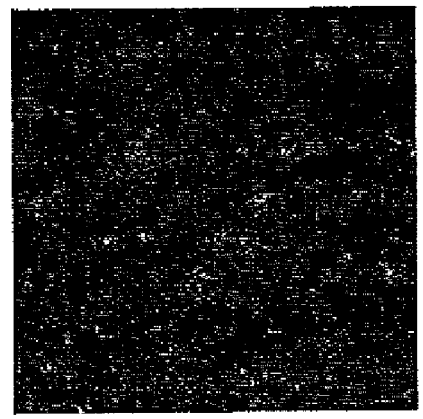
(B)
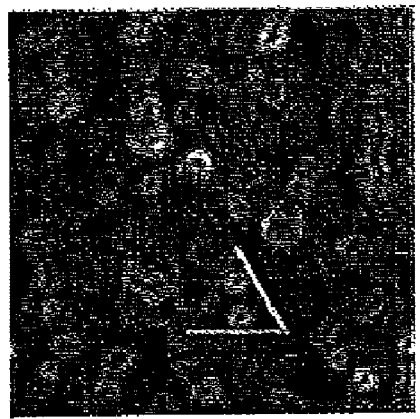
(E)
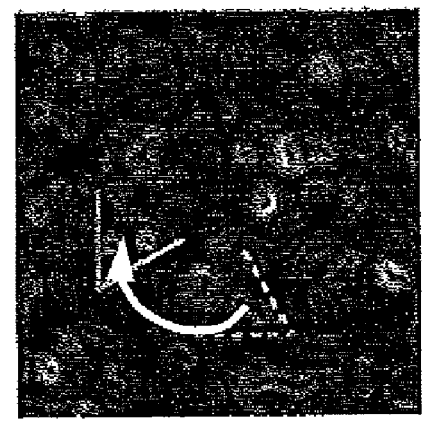
(C)
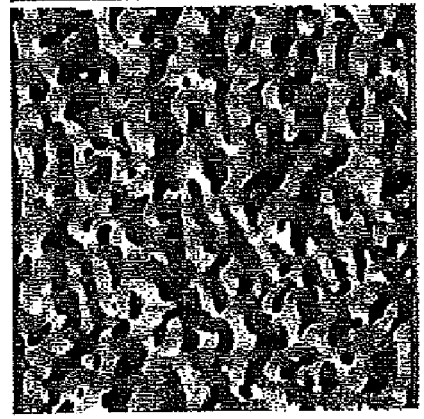
(F)
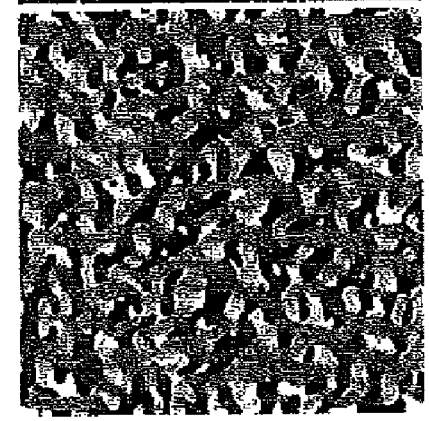

FIG.21
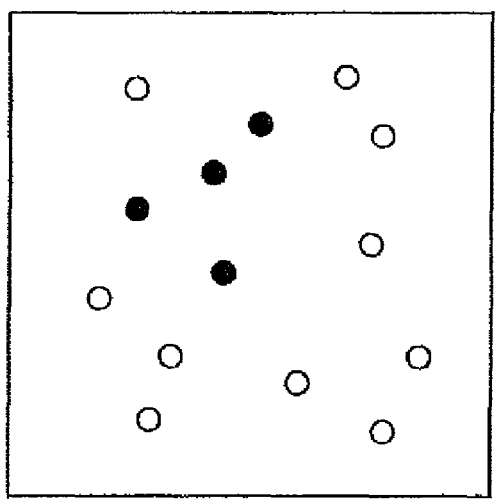
(A)
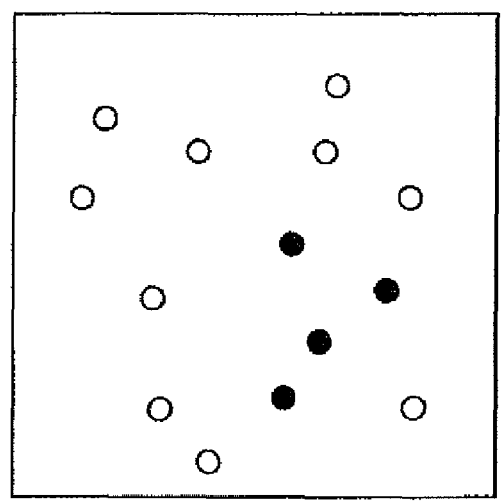
(B)

FIG.23
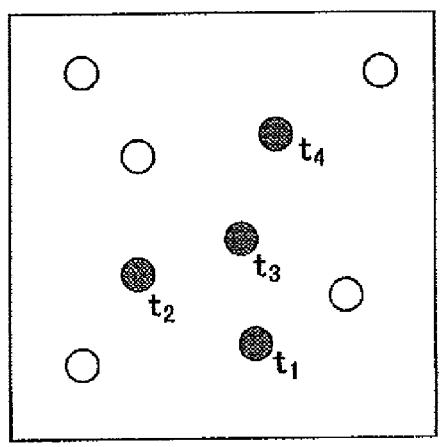
(A)
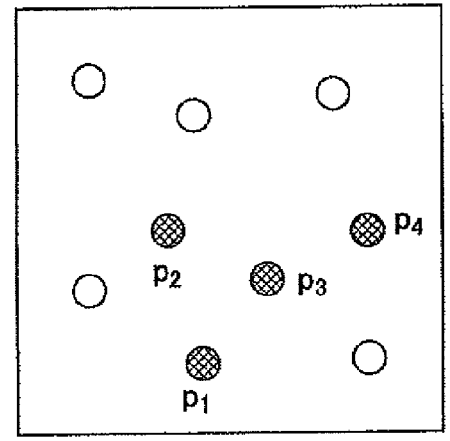
(B)
FIG.24
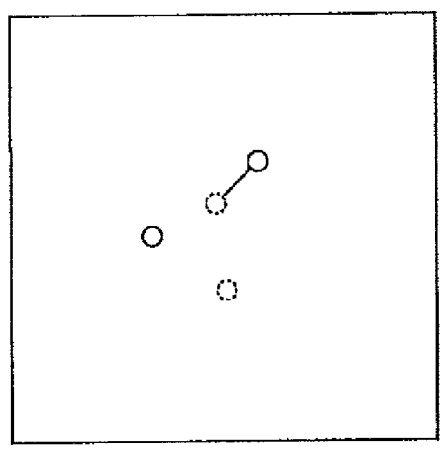
(A)
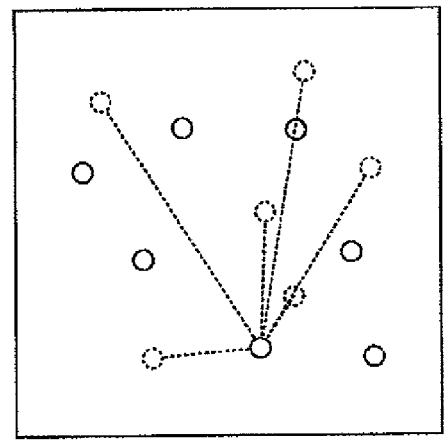
(B)

FIG.25
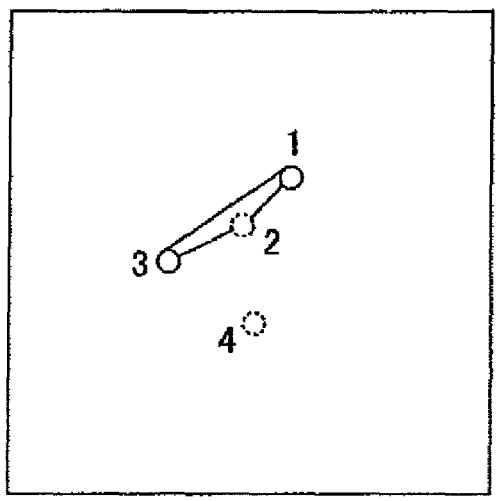
(A)
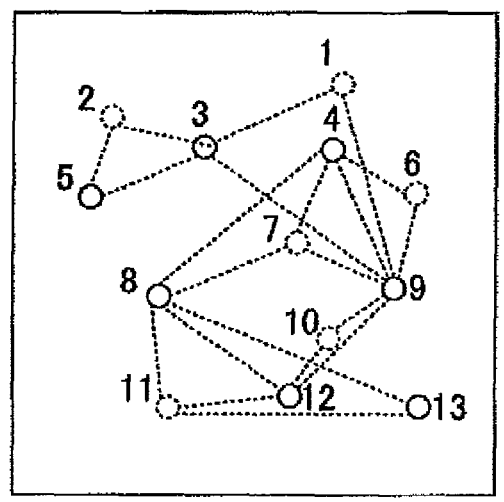
(B)

(A)  (B)

(A)  (B)

(A)  (B)

FIG.32
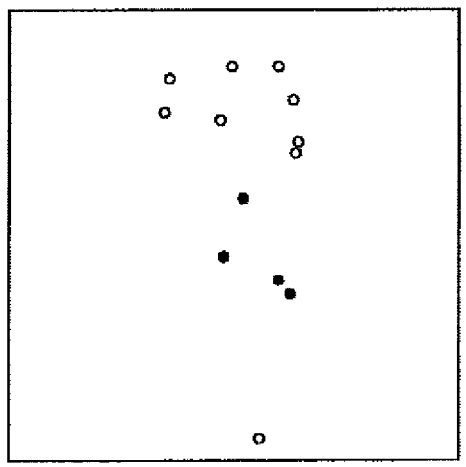
(A)
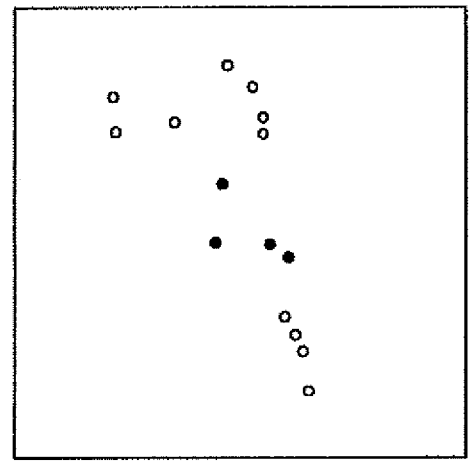
(B)
FIG.33
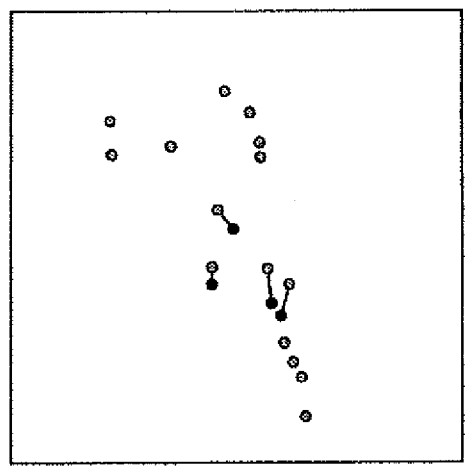
(A)
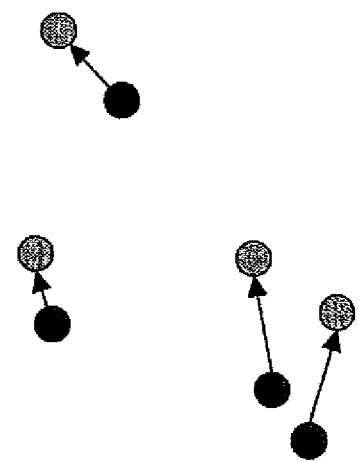
(B)

FIG.34
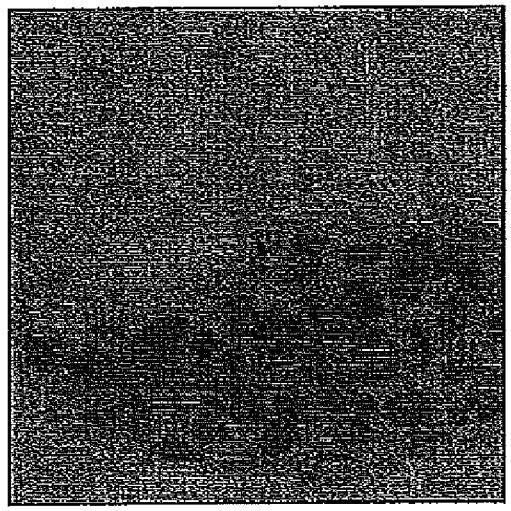
(A)
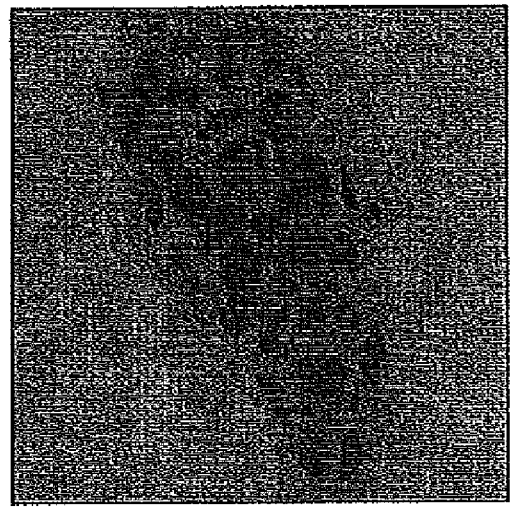
(B)

(A)  (B)

(A)  (B)

FIG.38 RELATED ART
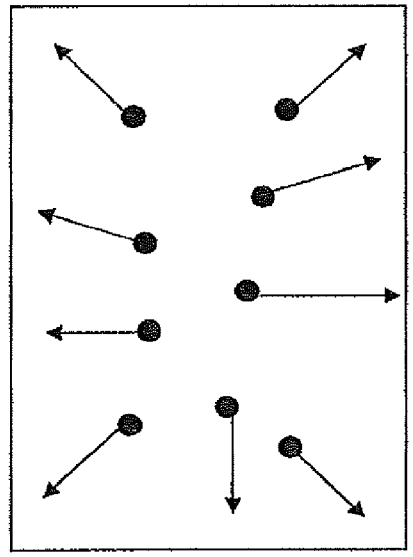
(B)
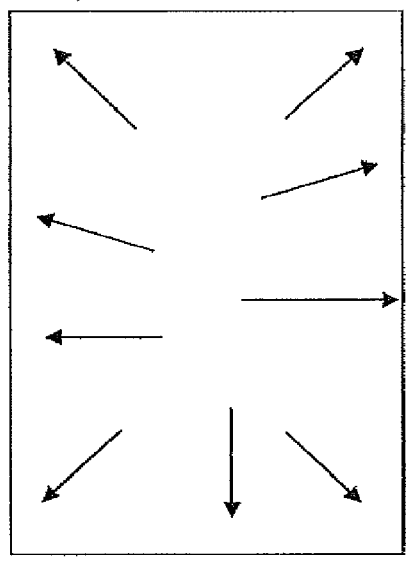
(C)
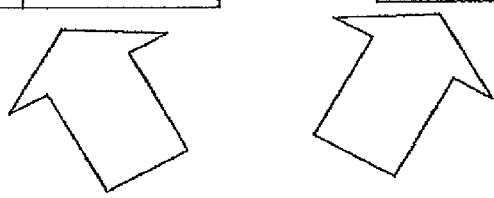
(A)

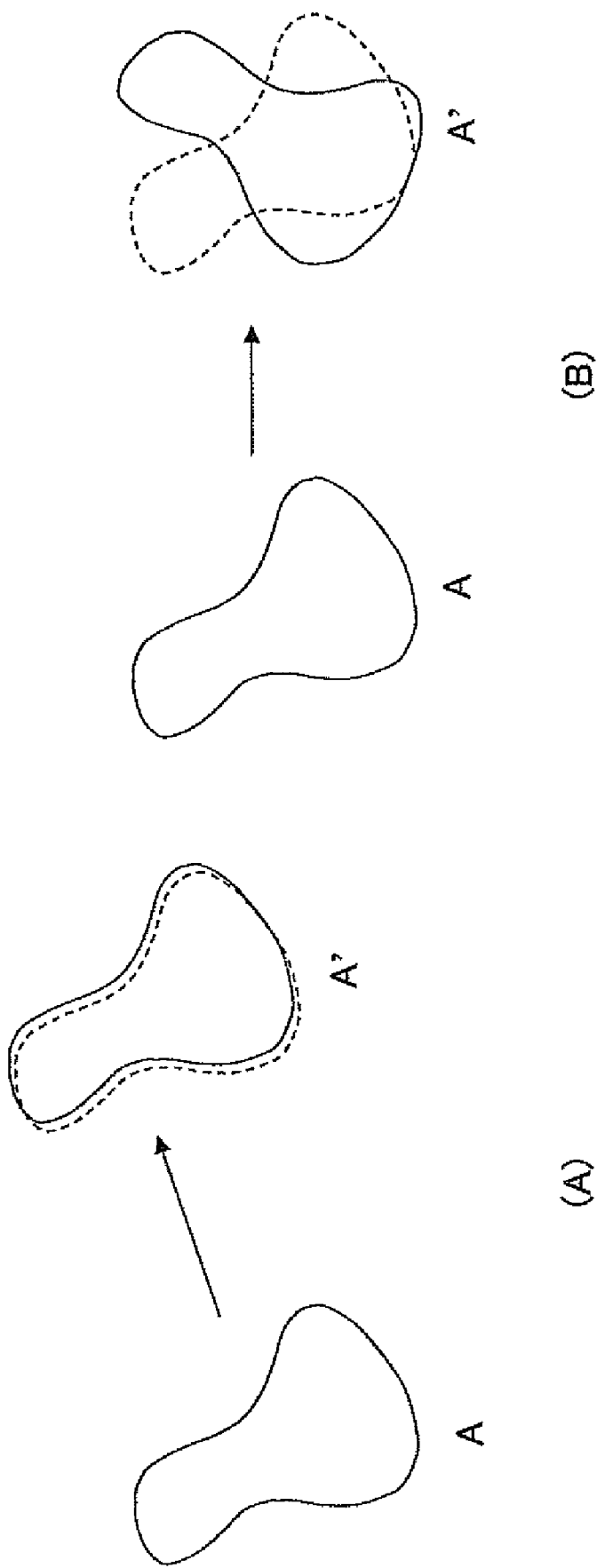

DISPLACEMENT DETECTION METHOD, DISPLACEMENT DETECTION DEVICE, DISPLACEMENT DETECTION PROGRAM, PHASE SINGULARITY MATCHING METHOD AND PHASE SINGULARITY MATCHING PROGRAM

TECHNICAL FIELD

The present invention generally relates to displacement detection methods, displacement detection devices, displacement detection programs, feature point matching methods and feature point matching programs, and more particularly to a displacement detection method, a displacement detection device, a displacement detection program, a feature point matching method and a feature point matching program which detect a displacement from phase singularities before and after a displacement.

BACKGROUND ART

Recently, techniques for making a contactless measurement of minute displacements of an object using, as an index, a pattern or texture having a spatially random structure such as a laser speckle pattern and a random dot pattern, play an important role in industrial applications including non-destructive inspections and material strength inspections. The correlation technique is known as a signal processing technique that is used when detecting minute displacements using the pattern or texture.

FIGS. 38 and 39 are diagrams for explaining an operation of the correlation technique. FIG. 38(A) shows displacements in a field, FIG. 38(B) shows the concept of the correlation technique, and FIG. 38(C) shows the concept of the measuring technique. In addition, FIG. 39(A) is a diagram for explaining a parallel displacement of an object A in one direction, and FIG. 39(B) is a diagram for explaining a rotary displacement of the object A.

When detecting the displacement by using the correlation technique, if the displacements in the field differ depending on the position as indicated by arrows in FIG. 38(A), it is necessary to separately compute the displacement for each region as shown in FIG. 38(B), and it is necessary to compute a two-dimensional correlation integration or a two-dimensional Fourier transform or inverse transform every time the correlation value is determined at each point. For this reason, if the number of computation points of the correlation value within the pixel is increased in order to increase the resolution of the displacement detection in one pixel or less, the computation time becomes extremely long.

In addition, according to the conventional correlation technique, it is possible to obtain the amount of displacement by obtaining the correlation with respect to the displacement in one direction as shown in FIG. 39(A), but this could not be applied to the rotary displacement as shown in FIG. 39(B).

As a method of computing the correlation function using phase information, the phase-only correlation technique is known (refer to Patent Document 1). This correlation technique suppresses the amplitude of a synthesized spectrum, which is a function of complex variable, to a constant or by use of a logarithmic function or the like, in order to create a fixed-amplitude complex synthesis spectrum solely including phase information and to obtain a cross-correlation function by subjecting the fixed-amplitude complex synthesis spectrum to a inverse Fourier transform.

Patent Document 1: Japanese Patent No. 3035654

DISCLOSURE OF THE INVENTION

Problems to be Solved by the Invention

According to the conventional displacement detection method, there were problems in that the computation time becomes extremely long and the rotary displacement cannot be detected with ease.

An object of the present invention is to provide a displacement detection method, a displacement detection device, a displacement detection program, a feature matching method and a feature matching program, which can reliably specify phase singularities before and after a displacement by specifying desired phase singularities from elements which characterize a structure of the phase singularities, and easily and reliably detect various displacements including rotary displacements.

Means of Solving the Problems

The present invention provides a displacement detection method for detecting a displacement from phase singularities before and after the displacement, characterized in that predetermined elements are acquired from a phase structure of the phase singularities, the phase singularities are specified based on the elements, and a position of the phase singularity after the displacement is detected.

Values of a real part and an imaginary part in a vicinity of the phase singularity may be linearly, interpolated with a plane, and the feature parameters that are acquired may be an angle at which a line segment making the real part zero and a line segment making the imaginary part zero intersect, an eccentricity of an oval shape of equi-intensity distribution in the vicinity of the phase singularity, and a gradient of the intensity in the vicinity of the phase singularity.

In addition, the positions of the specified phase singularities before and after the displacement may be specified based on the elements, and the displacement of the phase singularity may be measured based on the specified positions of the phase singularities before and after the displacement. In this case, a root-mean-square of a difference between the coordinates of the positions of the phase singularities before and after the displacement may be computed as the amount of displacement of the phase singularity.

A point where a sum of distances among a plurality of normal bisectors of line segments connecting the positions of a plurality of sets of phase singularities before and after the displacement becomes a minimum may be obtained as a center of rotation, and an angle of the sides sandwiching a center of rotation of a triangle which is defined by the positions of the phase singularities before and after the displacement and the obtained center of rotation may be obtained as a rotation angle.

Furthermore, the present invention may subject an intensity signal of an acquired image to a Fourier transform, carry out a filtering process which destroys the symmetry of the complex conjugates of the Fourier transformed signal to acquire pseudo phase information, and acquire the phase singularities based on the acquired pseudo phase information.

In this case, the filtering process may carried out using a Laguerre-Gaussian filter characteristic having a spiral phase characteristic with the phase singularity at the center with respect to the Fourier transformed signal and having a donut-shaped amplitude characteristic. Moreover, an image obtained by subtracting an average value of the intensity signal of the image from each intensity signal of the image may be regarded as the original image.

The pseudo phase information may be acquired by carrying out the filtering process using a filter characteristic having a spiral phase characteristic with the phase singularity at the center with respect to the Fourier transformed signal or using a Hilbert transform.

In addition, the present invention provides a point matching method for subjecting to a matching a feature point specified before a displacement and a feature point specified after the displacement, characterized in that the feature point after the displacement and corresponding to the feature point before the displacement is searched based on a difference between feature parameters of the feature point before the displacement and feature parameters of the feature point after the displacement, and the feature point after the displacement and corresponding to the feature point before the displacement is subjected to a matching, from a similarity of geometrical structural relationships of the feature points.

The set of feature points, which minimizes a difference between a sum total distance of the feature parameters among the plurality of feature points before the displacement and a sum total distance of the feature parameters among the plurality of feature points after the displacement, may be specified as the feature points to be subjected to a matching before the displacement and after the displacement.

The set of feature points which makes the following Formula 1 a minimum may be extracted as the set of feature points to be subjected to a matching before and after the displacement, where $T_{i1}$ and $T_{i2}$ denote feature parameters of a predetermined feature point before the displacement, $P_{w(i1)}$ and $P_{w(i2)}$ denote feature parameters of a predetermined feature point after the displacement, and $\alpha$ denotes the scale factor.

$$\min = \sum_{1 \leq i1, i2 \leq n} (|T_{i1} - T_{i2}| - \alpha |P_{w(i1)} - P_{w(i2)}|)^2 \quad \text{Formula 1}$$

The feature point is the phase singularity that is acquired based on the intensity information of the signal, and the phase singularity includes, as the feature parameters, the position information, the eccentricity, the vorticity and the angle at which the real axis and the imaginary axis intersect.

Effects of the Invention

According to the present invention, it is possible to obtain the effects of uniquely specifying each phase singularity before and after a displacement, and thereby tracking the phase singularity after the displacement, by acquiring predetermined elements from the phase structure of the phase singularities and specifying the phase singularity based on the elements.

BRIEF DESCRIPTION OF THE DRAWING

FIG. 7 is a diagram for explaining the operation of determining the position of the phase singularity to the sub pixels.

FIG. 13 is a diagram representing a displacement in x and y directions by a histogram by obtaining a difference among positions of all phase singularities.

FIG. 15 is a diagram for explaining a simulation experiment.

FIG. 21 is a diagram explaining an operation of a point matching process.

FIG. 23 is a diagram for explaining a process of a matching algorithm.

FIG. 24 is a diagram for explaining the process of the matching algorithm.

FIG. 25 is a diagram for explaining the process of the matching algorithm.

FIG. 32 is a diagram for explaining the results of the experiment and inspection.

FIG. 33 is a diagram for explaining the results of the experiment and inspection.

FIG. 34 is a diagram for explaining the results of the experiment and inspection.

FIG. 38 is a diagram for explaining an operation of a correlation technique.

FIG. 39 is a diagram for explaining the operation of the correlation technique.

DESCRIPTION OF THE REFERENCE NUMERALS

101 Displacement Detection Device
102 Measuring Target
111 Image Detecting Unit
112 Signal Processing Unit
121 Light Source
122 Image Pickup Device
131 Frame Memory
132 Processing Unit
133 Fourier Transform Unit
134 ROM
135 Hard Disk Drive
136 Display
137 Input Device

BEST MODE OF CARRYING OUT THE INVENTION

System Structure

Figure 1:
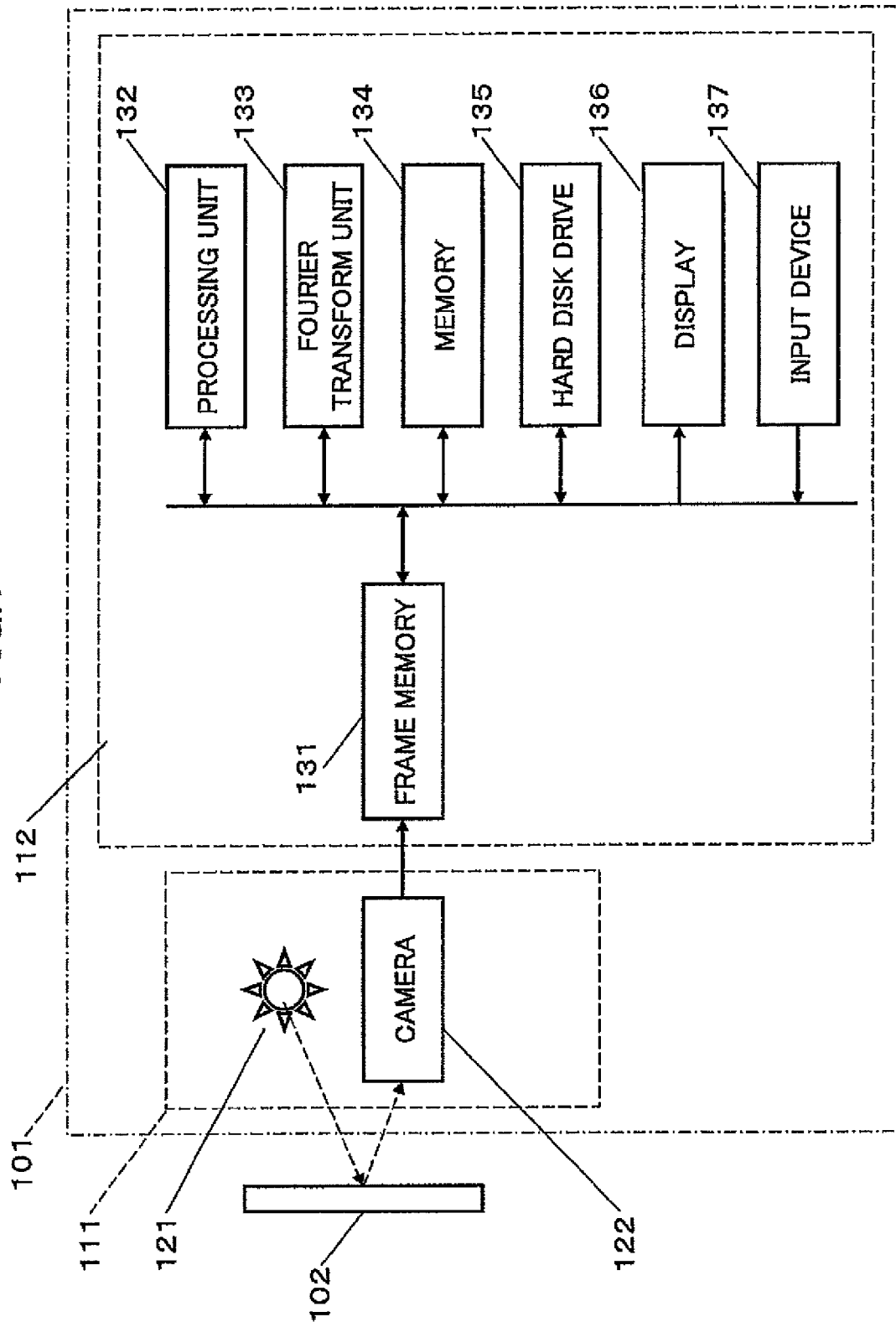
FIG. 1 is a diagram showing a system structure of an embodiment of the present invention.

FIG. 1 is a diagram showing a system structure of an embodiment of the present invention.

A displacement detection device 101 of this embodiment includes an image detecting unit 111 and a signal processing unit 112.

The image detecting unit 111 includes a light source 121 and an image pickup device 122. The image detecting unit 111 irradiates light from the light source 121 onto a measuring target 102, and picks up a surface image of the measuring target 102 by the image pickup device 122.

The image picked up by the image detecting unit 111 is supplied to the signal processing unit 112. The signal processing unit 122 is formed by a computer system, for example, and includes a frame memory 131, a processing unit 132, a Fourier transform unit 133, a ROM 134, a hard disk drive 135, a display 136 and an input device 137.

The frame memory 131 stores each frame of the image from the image detecting unit 111. The processing unit 132 executes a process of detecting minute displacements of the measuring target 102 based on a displacement detection program which is preinstalled in the hard disk drive 135.

The Fourier transform unit 133 carries out a Fourier transform with respect to the image picked up by the image detecting unit 111. The memory 134 is used as a work region of the processing unit 132. The hard disk drive 135 stores data, such as the displacement detection program, image data detected by the image detecting unit 111, intermediate results obtained by the displacement detection program, and displacement detection results.

The display 136 is formed by a LCD, CRT or the like, and displays images and processed results obtained by the processing unit 132, such as transformed images, intermediate results and displacement detection results. The input device 137 is formed by a keyboard, a mouse or the like, and is used to input data and various commands.

The displacement detection device 101 of this embodiment analyzes an image acquired from the measuring target 102 and detects a displacement of the measuring target 102, based on the installed displacement detection program.

Displacement Detection Program

Figure 2:
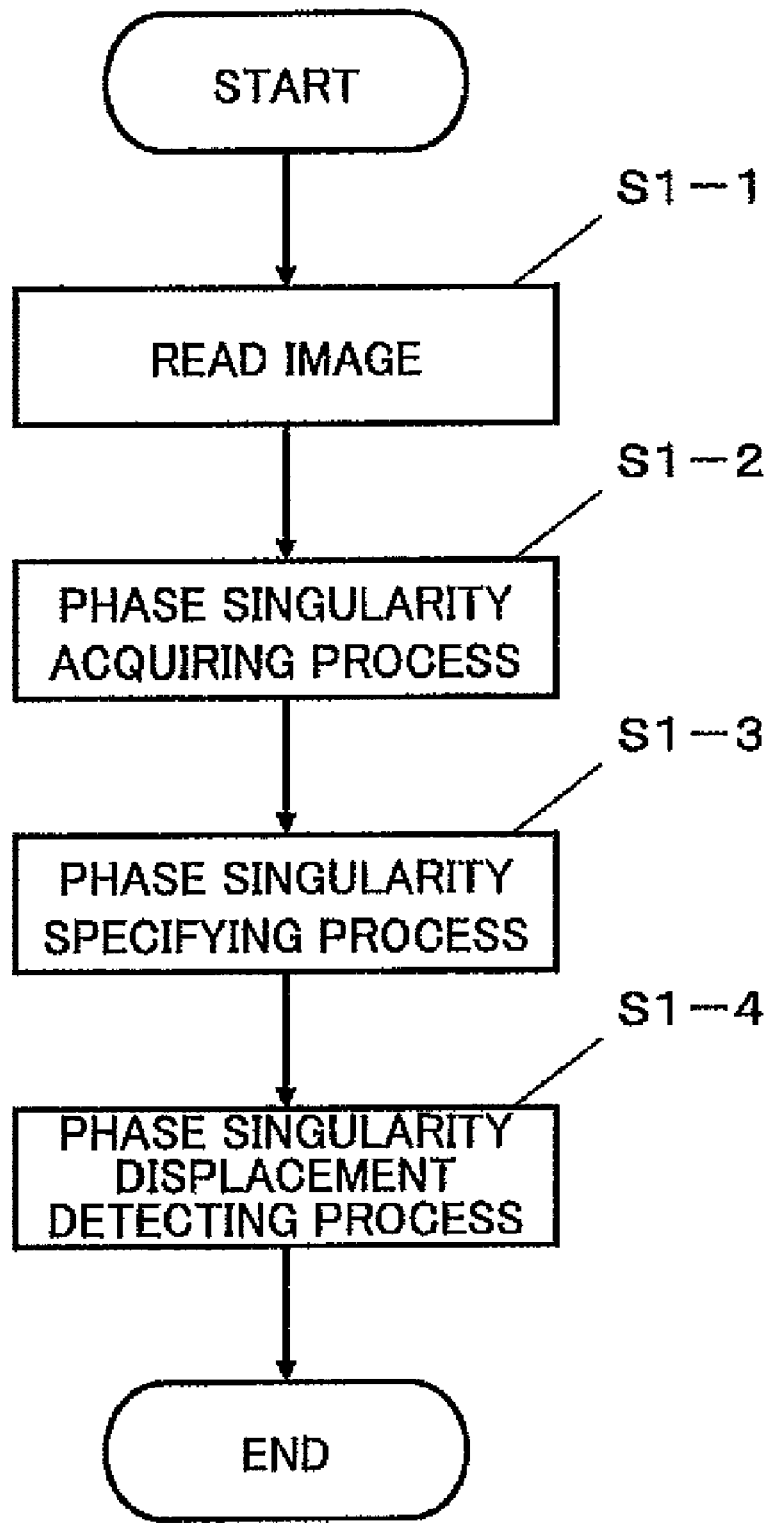
FIG. 2 is a flow chart of a process of a displacement detection program.

FIG. 2 is a flow chart of a process of the displacement detection program.

First, in a step S1-1, the processing unit 132 reads target images before and after the displacement from the hard disk drive 135 and into the memory 134, according to the displacement detection program.

Next, in a step S1-2, the processing unit 132 executes a phase singularity acquisition process for acquiring each phase singularity, with respect to the read target images before and after the displacement.

Then, in a step S1-3, the processing unit 132 executes a phase singularity specifying process for specifying phase singularities by elements, such as a zero-crossing angle of the real part and the imaginary part, an eccentricity and a vorticity, which are included in the phase singularities acquired from the target images before and after the displacement.

Next, in a step S1-4, the processing unit 132 executes a displacement detection process for specifying the corresponding phase singularities before and after the displacement, by the elements unique to the phase singularities, such as zero-crossing angle of the real part and the imaginary part, the eccentricity and the vorticity, and detecting the displacement of the target image from the positions of the phase singularities before and after the displacement.

By using the phase singularities, it is possible to accurately specify the displacement of the target image, by detecting the displacement of the target image.

Complex Analysis Signal Acquisition Process

Next, a description will be given of a phase singularity acquisition process of the step S1-2.

Figure 3:
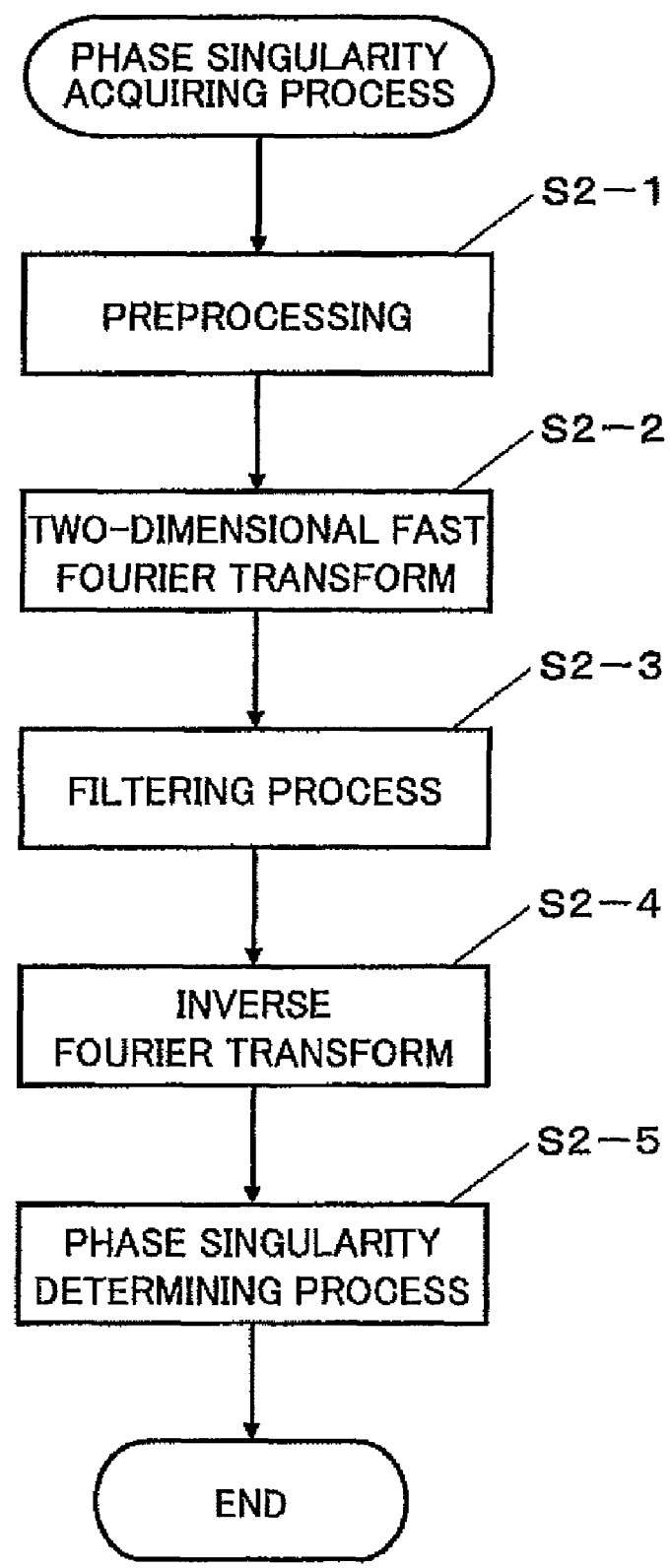
FIG. 3 is a flow chart of a process of a phase singularity acquisition process.
Figure 4:
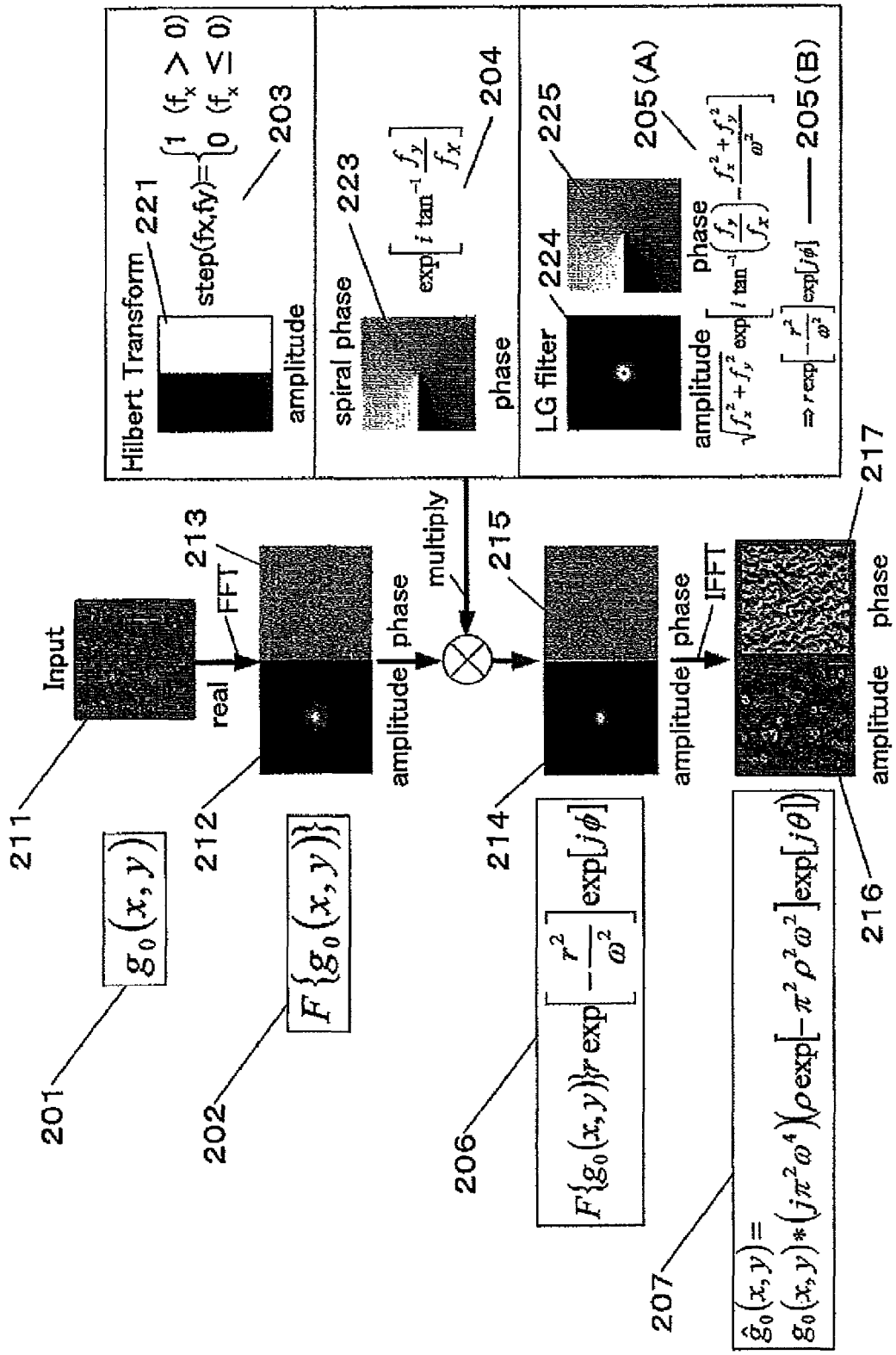
FIG. 4 is a diagram explaining an operation of the phase singularity acquisition process.
Figure 5:
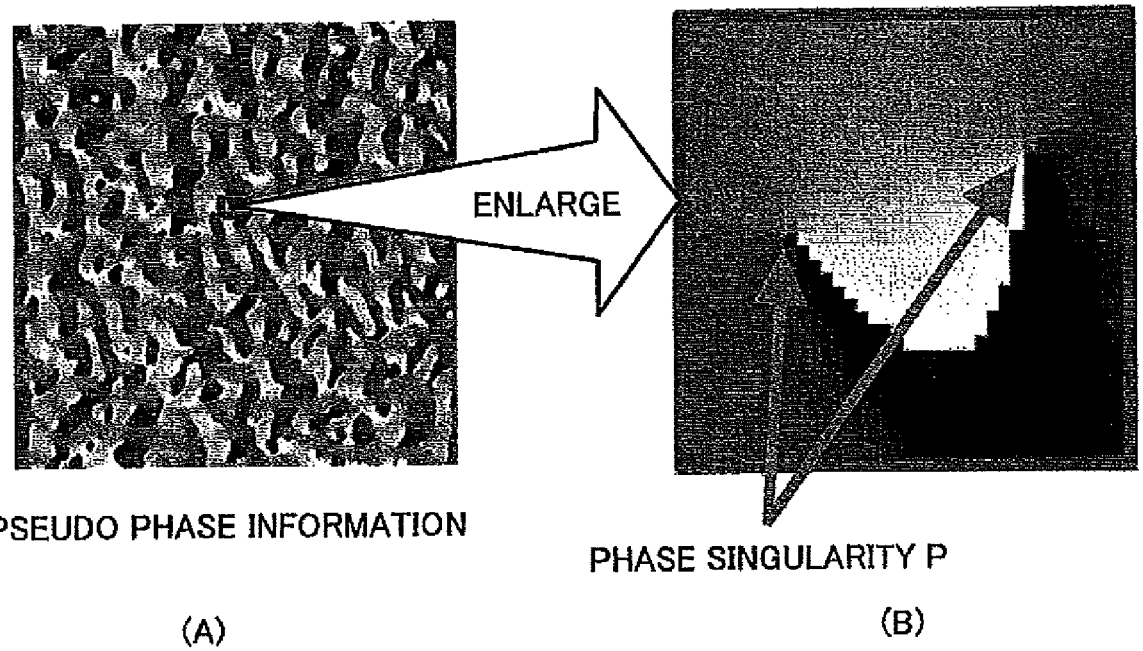
FIG. 5 is a diagram explaining the operation of the phase singularity acquisition process.

FIG. 3 is a flow chart of a process of a phase singularity acquisition process, and FIGS. 4 and 5 are diagrams explaining an operation of the phase singularity acquisition process.

The phase singularity acquisition process of the step S1-2 subjects an intensity signal of the acquired image to a Fourier transform, carries out a filtering process which destroys the symmetry of the complex conjugates of the Fourier transformed signal to acquire pseudo phase information, and acquires the phase singularity based on the acquired pseudo phase information.

The processing unit 132 first carries out a preprocessing in a step S2-1. The preprocessing of the step S2-1 includes a process of obtaining an average value of intensity information of the entire target image, and subtracting the obtained average value of the intensity information of the entire target image from the intensity information of the target image. By this process of the preprocessing, a D.C. component with the image data intensity information is eliminated. The phase singularity is emphasized by eliminating the D.C. component.

Next, in a step S2-2, the processing unit 132 controls the Fourier transform unit 133, and obtains a spatial frequency spectrum by carrying out a two-dimensional fast Fourier transform with respect to the intensity information.

For example, in FIG. 4, a function 201 of intensity information 211 of a texture of an object obtained by the image detecting unit 111 is denoted by a Formula 2.

$$g_o(x,y) \hspace{5em} \text{Formula 2}$$

The spatial frequency spectrum denoted by a Formula 3 is obtained by subjecting this intensity information to the two-dimensional Fourier transform.

$$F\{g_o(x,y)\} \hspace{5em} \text{Formula 3}$$

In FIG. 4, 212 indicates an amplitude distribution of the spatial frequency spectrum, and 213 indicates a phase distribution of the spatial frequency spectrum. The spatial frequency spectrum is obtained by subjecting to the Fourier transform the intensity information only having the real part, and for this reason, the spatial frequency spectrum has symmetry of complex conjugates with respect to a frequency origin, that is, Hermitian symmetry. The spatial frequency spectrum can be represented by a formula 202 when the FFT is indicated by a function F.

In a step S2-3, in order to create the imaginary part based on the real part and obtain a complex analytic signal, the processing unit 132 carries out a filtering process, which has distributions indicated by 221 through 225 in FIG. 4, and destroys the symmetry of the complex conjugates in a frequency region. For example, the filtering process may carried out using a Hilbert transform, a spiral phase filter, a Laguerre-Gaussian (LG) filter and the like. In FIG. 4, 221 indicates an amplitude distribution of the Hilbert transform, 222 indicates a phase distribution of the spiral phase filter, 224 indicates an amplitude distribution of the LG filter, and 225 indicates a phase distribution of the LG filter.

An arithmetic expression of the Hilbert transform may be represented as indicated by 203 in FIG. 4, for example. In addition, an arithmetic expression of the spiral phase filter may be represented as indicated by 204 in FIG. 4, for example. An arithmetic expression of the amplitude distribution 224 of the LG filter may be represented as indicated by 205(A) in FIG. 4. The LG filter can obtain a donut-shaped amplitude transmittance distribution, by merely shifting the complex conjugates by π in phase, symmetrically to the center. An arithmetic expression of the phase distribution 225 of the LG filter is represented as indicated by 205(B) in FIG. 4, by substituting an angle Ø into 205(A) in FIG. 4.

Therefore, by multiplying the arithmetic expressions 203, 204 and 205 to the arithmetic expression 202, it is possible to obtain the analytic signal that is required in this embodiment. In addition, it is possible to eliminate the high-frequency component which causes an error, and the D.C. component can automatically and continuously be made zero. Furthermore, by eliminating the low-frequency component by the donut-shaped intensity distribution, it is possible to increase the number of phase singularities.

Moreover, this embodiment carries out the analysis using the intensity information having a random pattern, and a circular spot pattern called a speckle appears in large numbers due to the structure of the measuring target 102 and the like. This speckle has a corresponding relationship to the phase singularity which is used as an index in this embodiment.

Depending on the size of this speckle, the frequency which includes many information of the phase singularities changes in the frequency region when the Fourier transform is carried out. For example, if the speckle size is small, the frequency component including the information of the phase singularities becomes high, and on the other hand, if the speckle size is large, the frequency component including the information of the phase singularities becomes low. In other words, in order to obtain the information of the phase singularities with a high accuracy, it is most suitable to use the LG filter having the donut-shaped intensity distribution, and the information of the phase singularities can be obtained with a higher accuracy by adjusting the size of the width of the donut-shaped intensity distribution depending on the speckle size. On the other hand, when a lowpass filter is used, it is difficult to obtain the information of the phase singularities by emphasizing the low-frequency component.

Accordingly, it is most suitable to use the LG filter in the process of generating the analytic signal in this embodiment.

In FIG. 4, 214 indicates an amplitude distribution after the filtering process, 215 indicates a phase distribution after the filtering process, and an arithmetic expression for this case can be represented as indicated by 206 in FIG. 4, for example.

A similar analytic signal can be obtained by employing a Hilbert transform indicated by 221 or a spiral phase filter indicated by 223, but it is necessary to eliminate the D.C. component in advance in order to employ the Hilbert transform or the spiral phase filter.

In a step S2-4, the processing unit 132 obtains a complex analytic signal denoted by a Formula 4 by subjecting the filtered spatial frequency spectrum to a inverse Fourier transform.

$$\hat{g}_o(x,y) \qquad \text{Formula 4}$$

In FIG. 4, 216 denotes an amplitude distribution after the inverse Fourier transform, 217 denotes a phase characteristic after the inverse Fourier transform, and an arithmetic expression for this case can be represented as indicated by 207 in FIG. 4, for example.

FIG. 5(A) shows the amplitude distribution after the inverse Fourier transform on an enlarged scale, and FIG. 5(B) shows a predetermined portion of FIG. 5(A) on a further enlarged scale.

A phase singularity P shown in FIG. 5(B) can be acquired from the pseudo phase information of this complex analytic signal.

Next, in a step S2-5, the processing unit 132 carries out a process of determining the position of the phase singularity with a resolution of sub pixels, which is higher than a resolution of one pixel.

Figure 6:
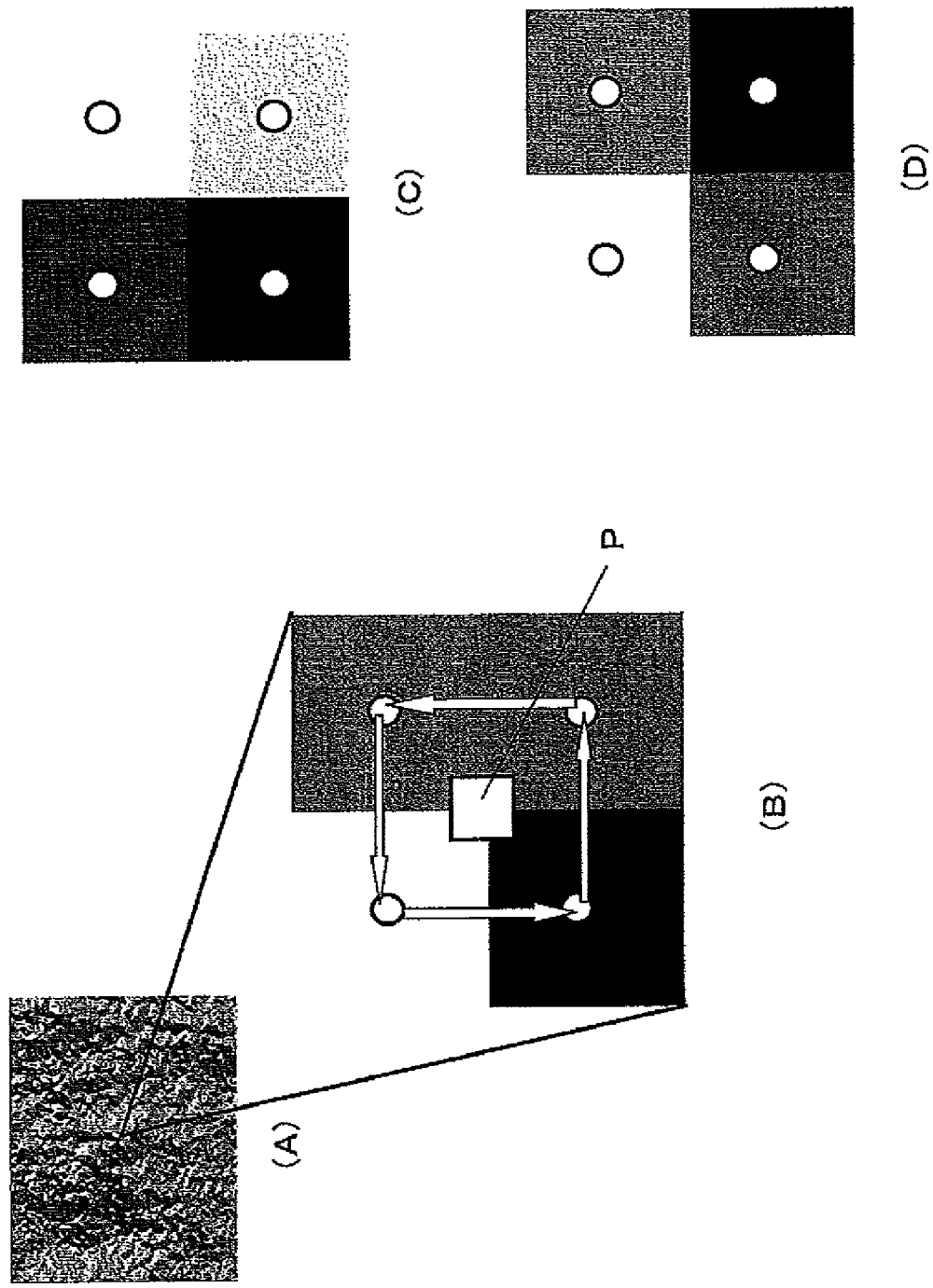
FIG. 6 is a diagram for explaining an operation of determining a position of a phase singularity by sub pixels.
Figure 8:
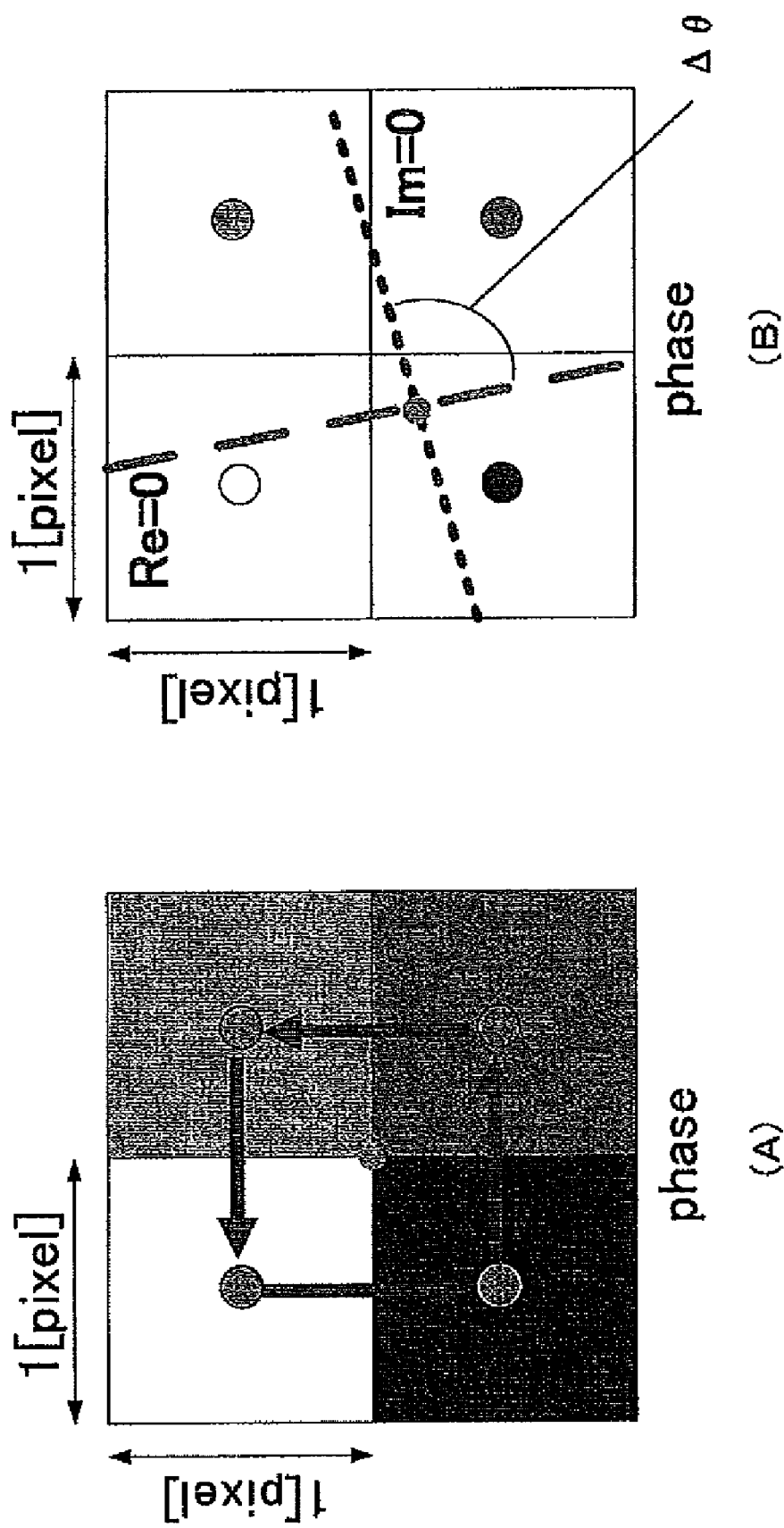
FIG. 8 is a diagram for explaining the operation of determining the position of the phase singularity to the sub pixels.

FIGS. 6, 7 and 8 are diagrams for explaining the operation of determining the position of the phase singularity to the sub pixels.

FIG. 6(A) shows the pseudo phase information, FIG. 6(B) shows neighboring pixels of the phase singularity on an enlarged scale, FIG. 6(C) shows the real part, and FIG. 6(D) shows the imaginary part. In addition, FIG. 7(A) shows the pseudo phase information in a vicinity of the phase singularity, FIG. 7(B) shows the imaginary part of the pseudo phase information in the vicinity of the phase singularity, FIG. 7(C) shows the real part of the pseudo phase information in the vicinity of the phase singularity, FIG. 7(D) shows a linear interpolation of the pseudo phase information in the vicinity of the phase singularity, FIG. 7(E) shows a linear-interpolation of the imaginary part of the pseudo phase information in the vicinity of the phase singularity, and FIG. 7(F) shows a linear interpolation of the real part of the pseudo phase information in the vicinity of the phase singularity.

The pseudo phase information takes values up to (−π, π), and the value becomes larger as a transition is made from black to white in FIGS. 6 and 7.

The phase singularity P has a property such that an integration of a phase gradient on a closed path surrounding the phase singularity P becomes an integer multiple of ±2π, and the real part and the imaginary part of the complex number both become zero.

With respect to a square closed path connecting four mutually adjacent pixels as shown in FIGS. 6(B) and 7(C), the position of the phase singularity may be determined by using the property according to which the integration of the phase gradient becomes an integer multiple of ±2π. But in this case, it is impossible to determine the position of the phase singularity with a resolution of one pixel or higher.

Hence, this embodiment determines the position of the phase singularity with a resolution of sub pixels, which is higher than the resolution of one pixel, using a property according to which the real part and the imaginary part of the complex number both become zero. In this embodiment, the discrete real part and imaginary part in the vicinity of the phase singularity shown in FIGS. 7(B) and 7(C) are subjected to a linear interpolation on a plane, in order to smoothen the structure of the real part and the imaginary part as shown in FIGS. 7(E) and 7(F), and to obtain a line segment Lre0 for which the real part becomes zero and a line segment Lim0 for which the imaginary part becomes zero. By setting the position of the phase singularity P to the intersection of the line segment Lre0 for which the real part becomes zero and the line segment Lim0 for which the imaginary part becomes zero as shown in FIG. 7(D), it is possible to determine the phase singularity with the resolution of the sub pixels.

By the method using the property according to which the integration of the phase gradient becomes an integer multiple of ±2π as shown in FIG. 8(A), it is possible to know that the phase singularity exists somewhere within the square closed path having an area of one pixel, but it is impossible to specify the position of the phase singularity. On the other hand, by the method using the property according to which the real part and the imaginary part of the complex number both become zero as shown in FIG. 8(B), it is possible to obtain the phase singularity from interpolation of the real part and the imaginary part and the zero-crossing of the real part and the imaginary part, and to determine the position of the phase singularity with the resolution of the sub pixels which are smaller than one pixel.

Phase Singularity Specifying Process

Figure 9:
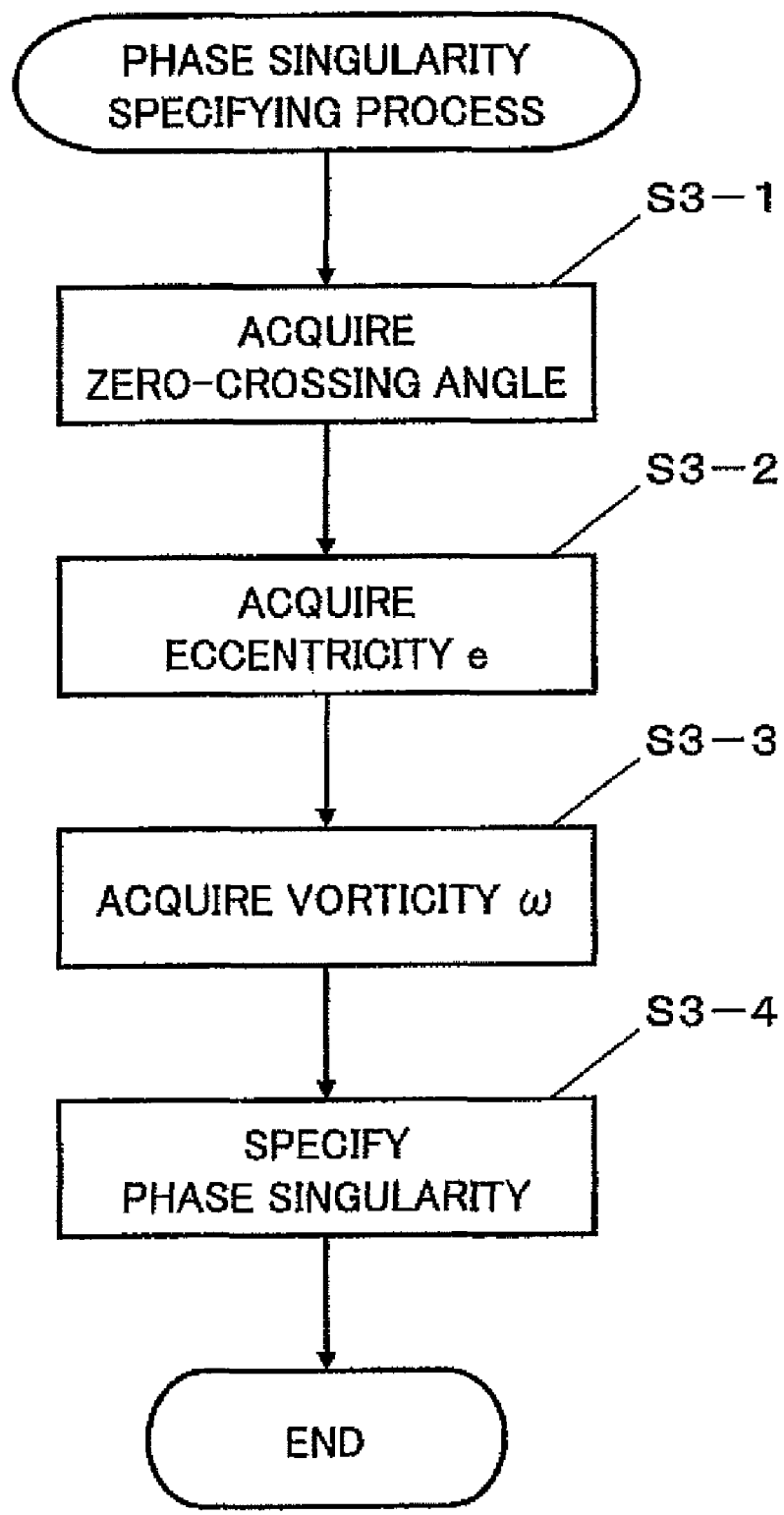
FIG. 9 is a flow chart of a phase singularity specifying process.

FIG. 9 is a flow chart of a phase singularity specifying process.

The phase singularity specifying process of a step S1-3 acquires predetermined elements from the phase structure of the phase singularity, and specifies the phase singularity based on the acquired elements.

In the step S3-1, the processing unit 132 acquires the zero-crossing angle as the element specifying the phase singularity. The zero-crossing angle is an angle Δθ at which the line segment Lre0 for which the real part becomes zero and the line segment Lim0 for which the imaginary part becomes zero intersect as shown in FIGS. 7(D) and 8(B).

In addition, the processing unit 132 acquires the eccentricity e as the element specifying the phase singularity in a step S3-2, and acquires the vorticity ω in a step S3-3.

Figure 10:
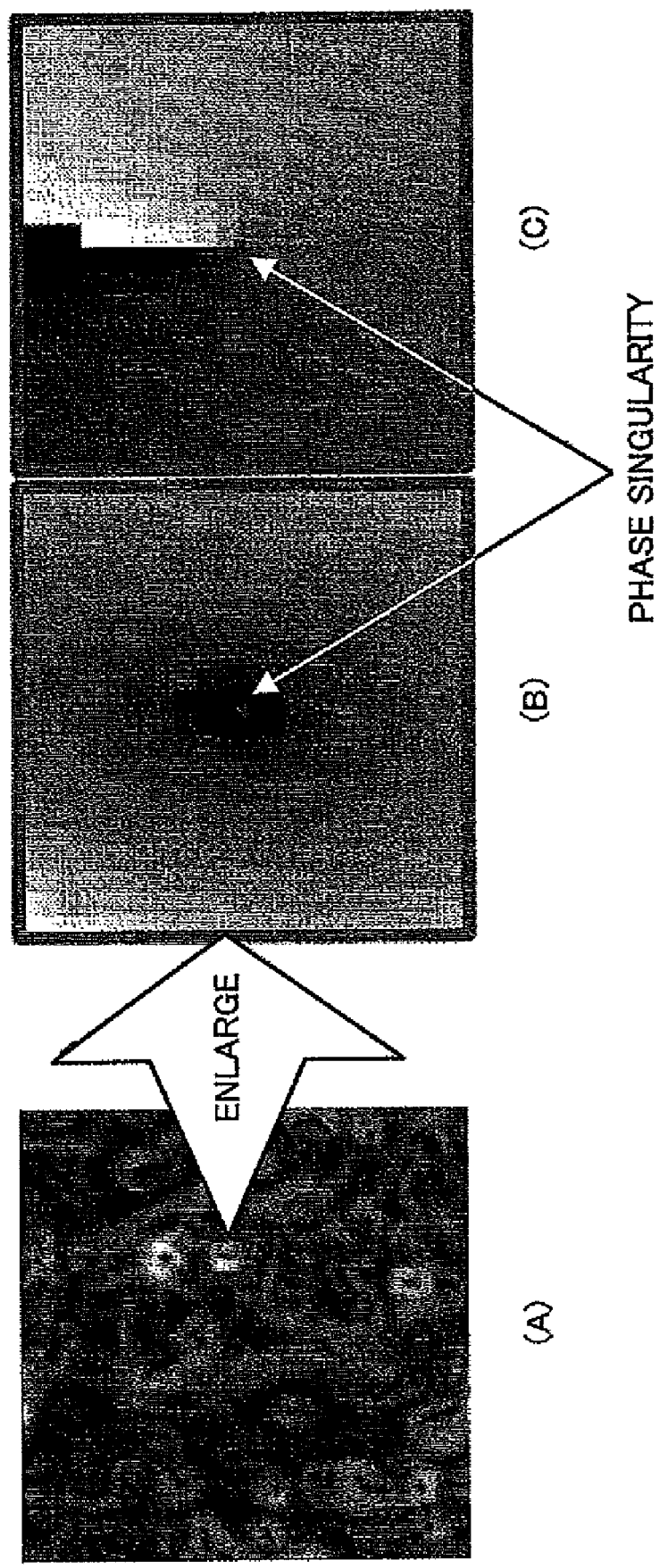
FIG. 10 is a diagram for explaining an operation of acquiring an eccentricity e and a vorticity ω.
Figure 11:
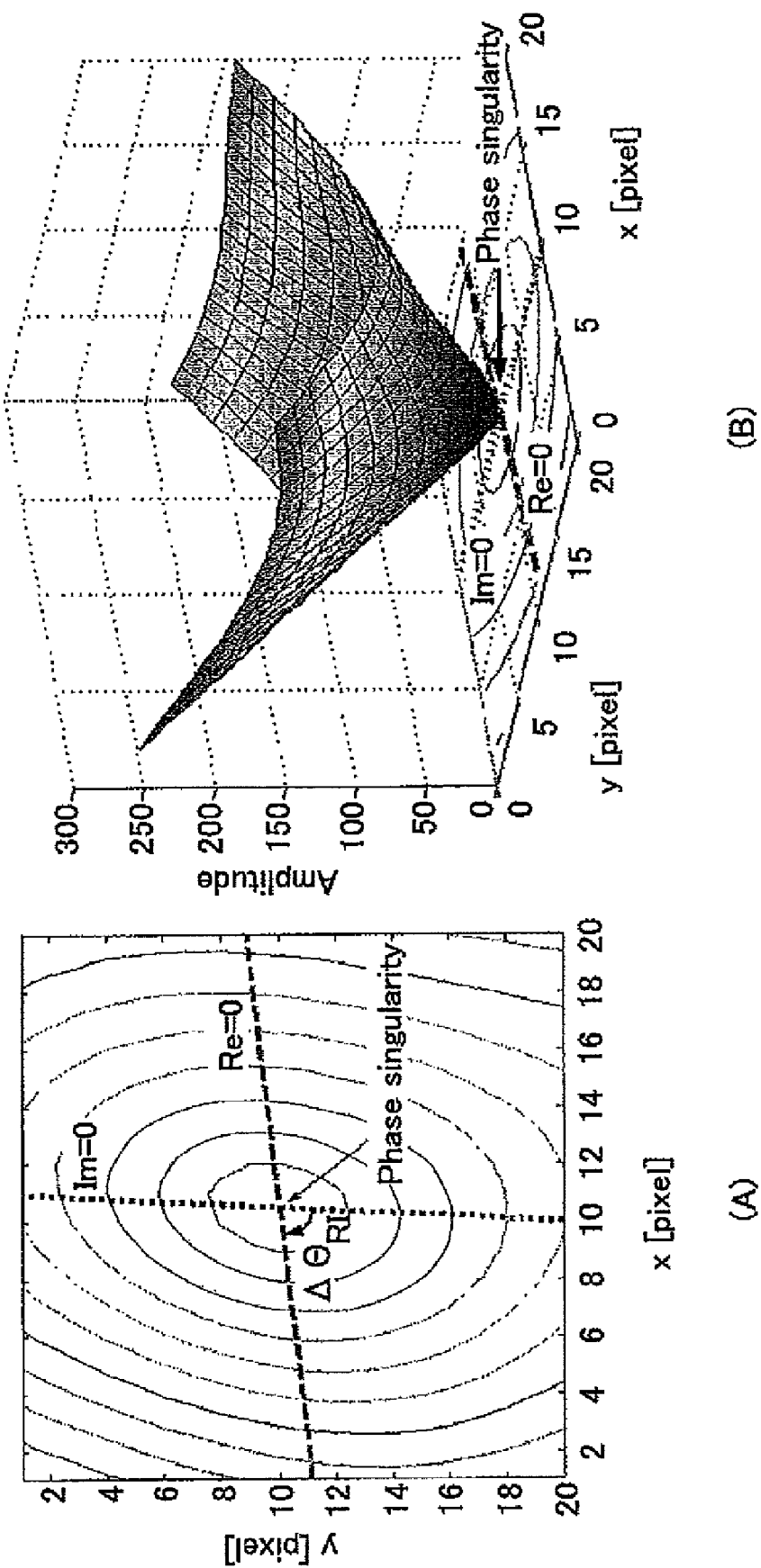
FIG. 11 is a diagram for explaining the operation of acquiring the eccentricity e and the vorticity ω.
Figure 12:
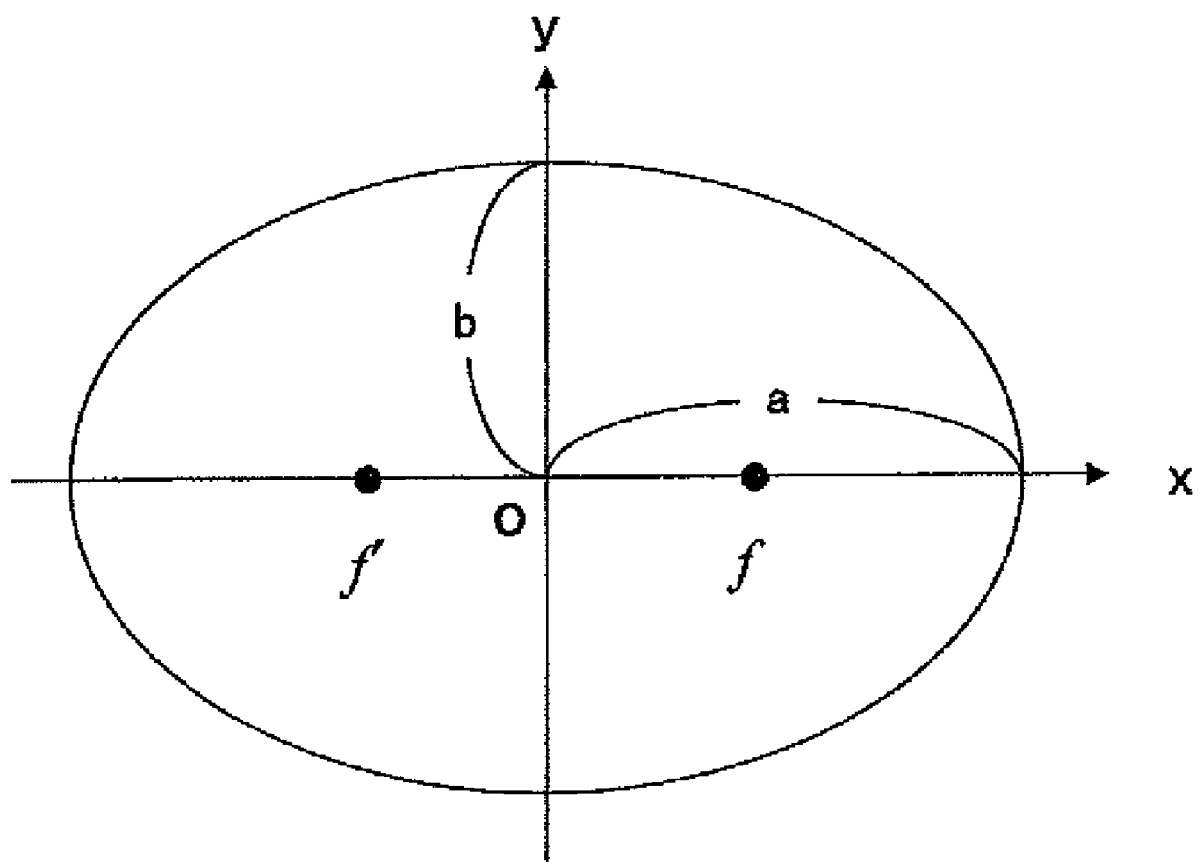
FIG. 12 is a diagram for explaining the operation of acquiring the eccentricity e and the vorticity ω.

FIGS. 10, 11 and 12 are diagrams for explaining an operation of acquiring the eccentricity e and the vorticity ω. FIG. 10(A) shows the pseudo phase information, FIG. 10(B) shows the amplitude distribution of the pseudo phase information in the vicinity of the phase singularity, and FIG. 10(C) shows the phase distribution of the pseudo phase information in the vicinity of the phase singularity.

As shown in FIG. 10(B), the amplitude distribution becomes darker towards the vicinity of the phase singularity, which indicate that the value is approaching zero.

FIG. 11 shows a structure of the amplitude distribution in the vicinity of the phase singularity. FIG. 11(A) illustrates the amplitude by contour lines, and FIG. 11(B) illustrates the amplitude by a three-dimensional representation.

As shown in FIG. 11(A), the distribution of the same amplitude in the vicinity of the phase singularity has an approximate oval shape. Generally, the amplitude distribution in the vicinity of the phase singularity has the approximate oval shape, and because the shape of the amplitude distribution differs depending on the phase singularity, the shape of the amplitude distribution may be used as an element specifying the phase singularity. It becomes possible to specify the phase singularity by representing the feature of the oval shape by the eccentricity which is a value representing the feature of a quadratic curve.

For example, oval shape shown in FIG. 12 can in general be represented by a Formula 5.

$$\frac{x^2}{a^2} + \frac{y^2}{b^2} = 1$$ Formula 5

The eccentricity e of the oval shape shown in FIG. 12 can be represented by a Formula 6, where "a" denotes a radius of the long axis, "b" denotes the radius of the short axis, and "f" denotes a focal distance.

$$e = \frac{f}{a} = \sqrt{1 - \frac{b^2}{a^2}}$$ Formula 6 where 0≦(ECCENTRICITY e)<1

When the three-dimensional representation of the amplitude shown in FIG. 11(B) is observed, it may be seen that the shape in the vicinity of the phase singularity has a structure similar to an oval conical shape. Hence, in this embodiment, the vorticity in the vicinity of the phase singularity is obtained as one element which specifies each phase singularity. The vorticity is a quantity representing an intensity and a direction of local rotation of a minute portion. The vorticity becomes larger as the pitch of the contour lines of the amplitude becomes narrower in FIG. 11(A), and the vorticity becomes larger as the gradient (rate of change) becomes steeper in the vicinity of the phase singularity in the three-dimensional representation shown in FIG. 11(B). In other words, the vorticity is dependent on the amplitude in the vicinity of the phase singularity.

The vorticity ω is represented by the Formula 7.

$$\omega = \Box r \times \nabla i$$ Formula 7

(where r is the real part, and i is the imaginary part)

As described above, the phase singularity has the feature parameters including the position (x, y), the zero-crossing angle Δθ, the eccentricity e and the vorticity ω, and each phase singularity can be uniquely specified using each feature parameter. The phase singularity can be specified more reliably using a plurality of these feature parameters, in a step S3-4.

Linear Displacement Detection

Next, a description will be given of a phase singularity displacement detection process of a step S1-4.

The phase singularity displacement detection process detects an amount of displacement by specifying the phase singularities before and after the displacement according to the specifying method described above.

First, the phase singularity is specified using the zero-crossing angle θ, the eccentricity e and the vorticity ω which are obtained in the manner described above, as the parameters uniquely specifying the phase singularities before and after the displacement. The parameters before the displacement are denoted by θ1, e1 and ω1, and the parameters after the displacement are denoted by θ2, e2 and ω2.

When an absolute value of a difference (Δθ2−Δθ2, e2−e1, ω2−ω1) between the parameters Δθ1, e1, ω1) and (Δθ2, e2, ω2) is smaller than a certain value, it is regarded that the phase singularities are identical. Because each phase singularity can be uniquely specified, it is possible to know where each phase singularity moves from before the displacement to after the displacement. The amount of displacement can be obtained from a difference between a position (x1, y1) of the phase singularity before the displacement and the position (x2, y2) of the phase singularity after the displacement.

The actual amount ΔL of displacement can be represented by Formula 8, where Δx=(x2−x1) and Δy=(y2−y1).

$$\Delta L = \sqrt{\Delta x^2 + \Delta y^2}$$ Formula 8

FIG. 13 is a diagram representing the displacement in x and y directions by a histogram by obtaining the difference among positions of all phase singularities. FIG. 13(A) shows the displacement in the x direction, and FIG. 13(B) shows the displacement in the y direction.

As shown in FIG. 13, it may be seen that the positions of all phase singularities were displaced approximately in parallel in the x direction.

Rotary Displacement Detection

This embodiment can also detect rotation because each phase singularity can be specified before and after the rotary displacement.

Figure 14:
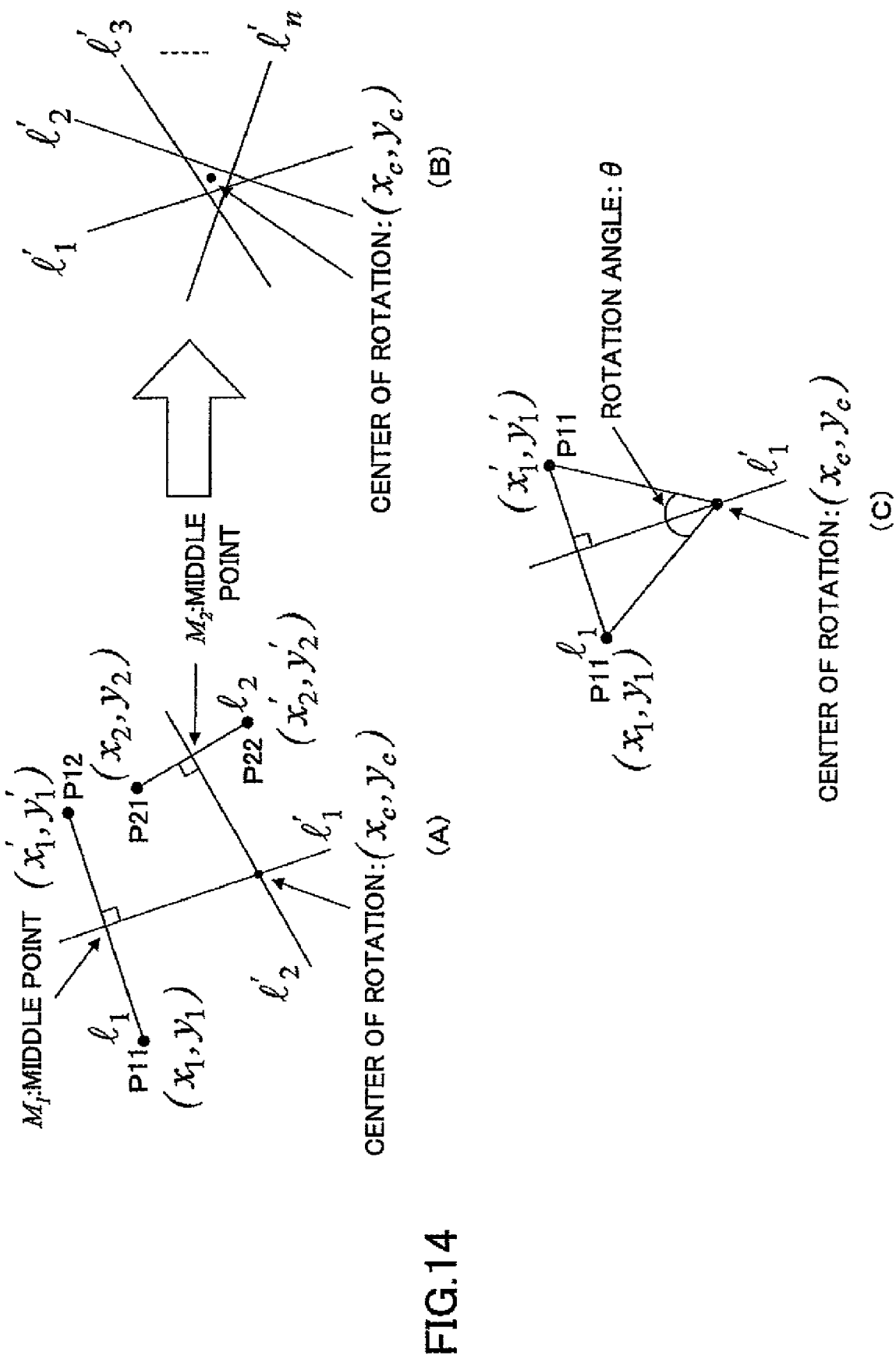
FIG. 14 is a diagram for explaining a rotary displacement detection operation.

FIG. 14 is a diagram for explaining a rotary displacement detection operation.

As shown in FIG. 14(A), it the xy coordinates of the two sets of phase singularities are respectively denoted by (x1, y1) and (x2, y2) for the phase singularities P1 and P12 before the rotation, and by (x'1, y'1) and (x'2, y'2) for the phase singularities P21 and P22 after the rotation, a center (xc, xy) of rotation becomes an intersection of normal bisectors represented by Formula 9 of line segments connecting the phase singularities P11 and P12 and the phase singularities P21 and P22 before and after the rotation, as shown in FIG. 14(A).

$$l_1', l_2'$$ Formula 9

Generally, in order to obtain the center of rotations it is sufficient if the two sets of phase singularities before and after the rotation are known, but since a large number of phase singularities actually exist, the normal bisectors obtained from each of the phase singularities not always intersect at one point, as shown in FIG. 14(B). In such a case, the center (xc, yc) of rotation is obtained by the method of least squares so that the sum of the distances between the center (xc, yc) of rotation and each of the normal bisectors becomes a minimum.

The center of rotation can be determined in the manner described above.

Next, the rotation angle θ can be obtained using the cosine theorem with respect to a triangle which is formed by the center (xc, yc) of rotation and each of the phase singularities P11 and P12 before and after the rotation, as shown in FIG. 14(C).

Therefore, the rotary displacement can be detected according to this embodiment.

Simulation Experiment Results

A simulation experiment was conducted using the intensity information before and after the rotation, by rotating by 90 degrees the intensity information obtained by the experiment within a computer.

FIG. 15 is a diagram for explaining the simulation experiment. FIG. 15 shows the amplitude distribution and the phase distribution for the case where the number of pixels is 1024× 1024, and two analytic signals are obtained from the intensity information before and after the rotation using the LG filter. FIG. 15(A) shows the pseudo phase information before the rotary displacement, FIG. 15(B) shows the amplitude distribution of the pseudo phase information before the rotary displacement, FIG. 15(C) shows the phase distribution of the pseudo phase information before the rotary displacement, FIG. 15(D) shows the pseudo phase information after the rotary displacement, FIG. 15(E) shows the amplitude distribution of the pseudo phase information after the rotary displacement, and FIG. 15(F) shows the phase distribution of the pseudo phase information after the rotary displacement.

The number of phase singularities for this case was the same for both the phase singularities before and after the rotation, the number of positive phase singularities being 322, the number of negative phase singularities being 321, and the total number of phase singularities being 643. As clearly seen from the amplitude distributions shown in FIGS. 15(B) and 15(E), the two ring-shaped amplitudes before the rotation and surrounded by triangles rotate by 90 degrees with respect to the center of rotation (center of all pixels) after the rotation.

Next, the angle Δθ at which straight lines Re=0 and Im=0 intersect, the eccentricity e, and the vorticity ω are obtained with respect to all phase singularities before and after the rotation, as the elements for specifying the phase singularities. The following conditions were used to search the corresponding phase singularities before and after the rotation.

Condition 1: A difference of the angle Δθ at which the straight lines Re=0 and Im=0 intersect before and after the rotation is ±0.5 degree or less;

Condition 2: A difference of the eccentricity e before and after the rotation is ±0.005 or less; and Condition 3: A difference of the vorticity ω before and after the rotation is ±0.05 or less.

A check was made to determine whether the phase singularity before the rotation and the phase singularity after the rotation have a 1:1 correspondence.

Figure 16:
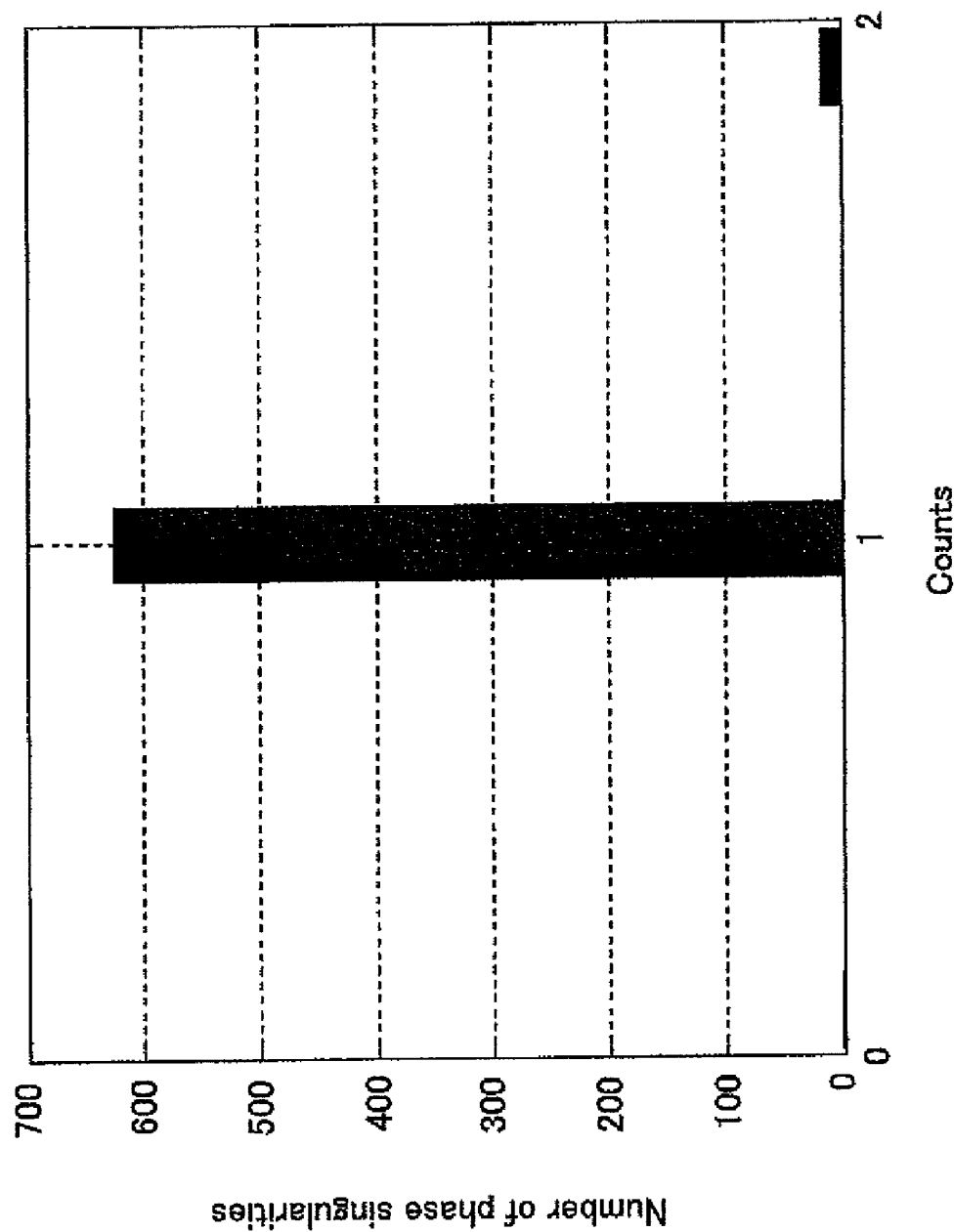
FIG. 16 is a diagram representing a number of phase singularities before and after a rotation by a histogram.

FIG. 16 is a diagram representing the number of phase singularities before and after the rotation by a histogram.

Virtually all phase singularities before and after the rotation were uniquely specified.

The center of rotation of the measured results obtained by simulation was (xc, yc)=(511.5, 511.5). This center of rotation matched the center of rotation, namely, (xc, yc)=(511.5, 511.5), which was set.

Figure 17:
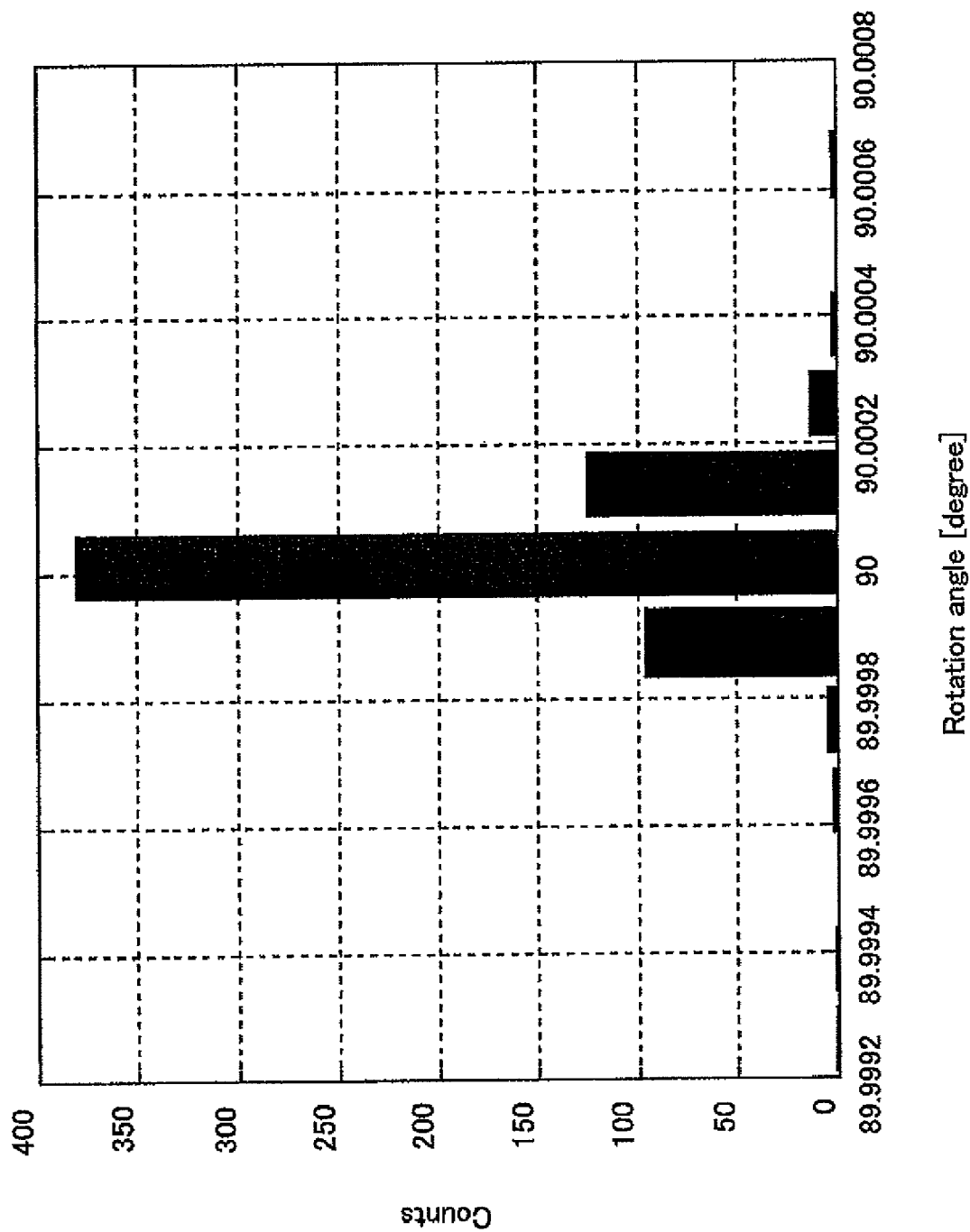
FIG. 17 is a diagram representing rotation angles θi of the phase singularities before and after the rotation by a histogram.

FIG. 17 is a diagram representing rotation angles θi obtained from the phase singularities before and after the rotation and the center of rotation, by a histogram.

The histogram of the rotation angles, which are simulation results, indicate that all singularities have rotated by 90 degrees with an accuracy of ±0.001 degree. In the simulation experiment, the measured target 102 was rotated by 90 degrees, and because the measured results shown in FIG. 17 also indicate the 90-degree rotation, it was confirmed from the measured results that the present invention also provides an effective measurement with respect to the rotation.

Figure 18:
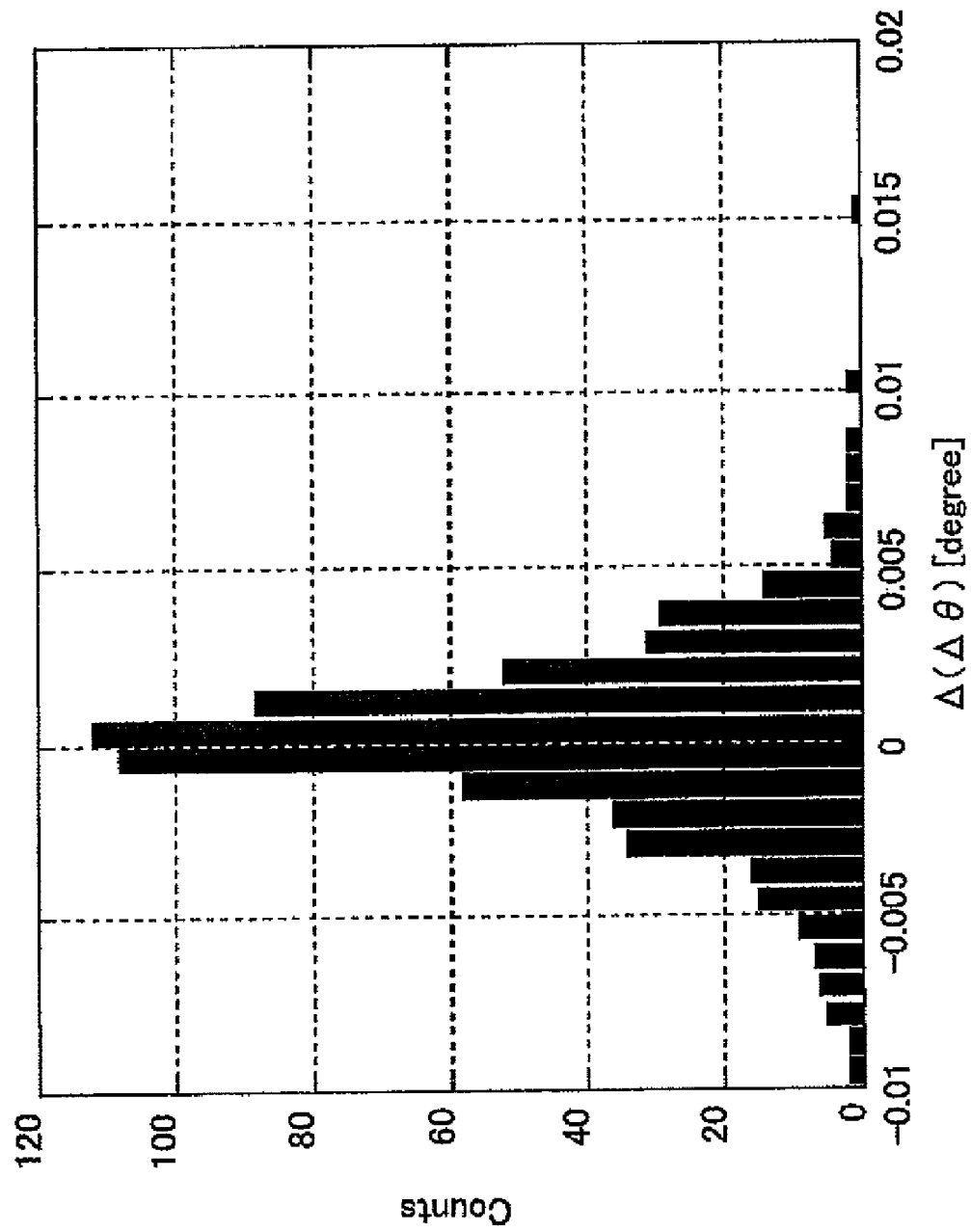
FIG. 18 is a diagram representing differences in angles Δθ before and after the rotation by a histogram.
Figure 19:
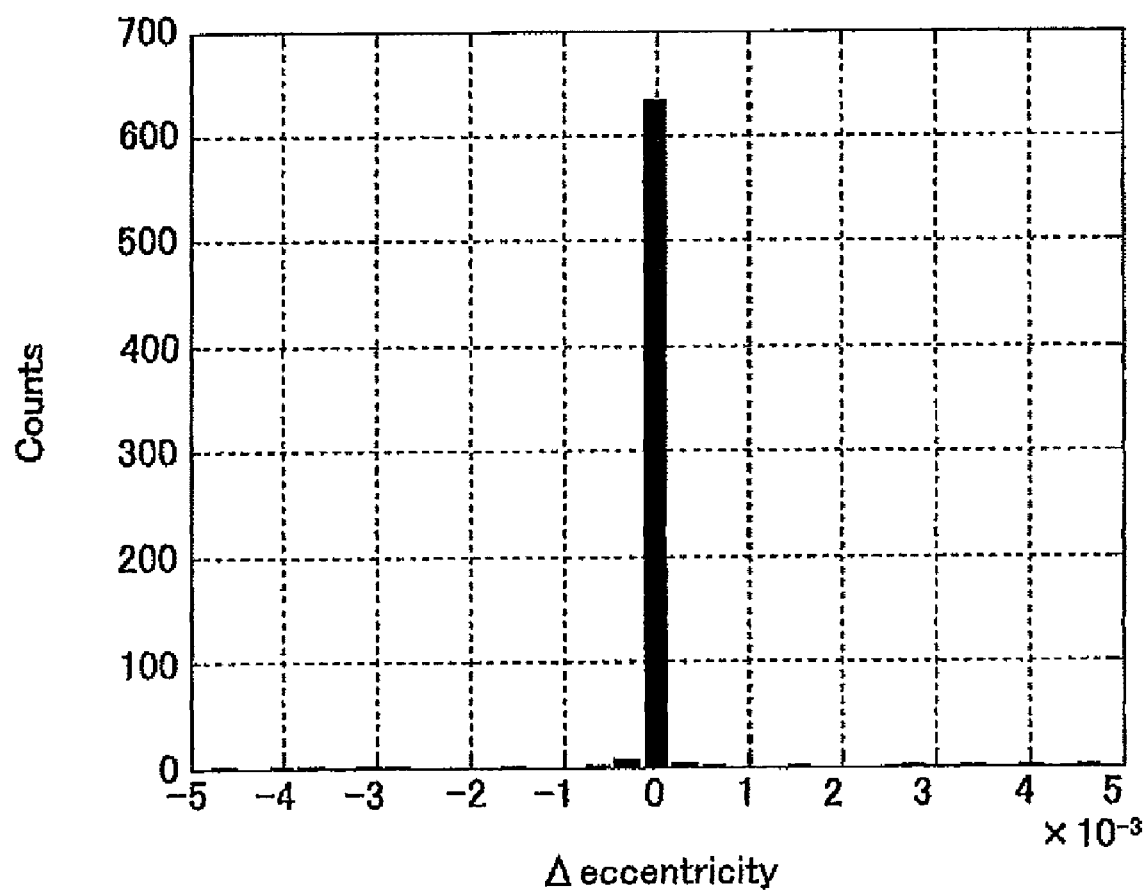
FIG. 19 is a diagram representing the eccentricities e of the corresponding phase singularities before and after the rotation by a histogram.
Figure 20:
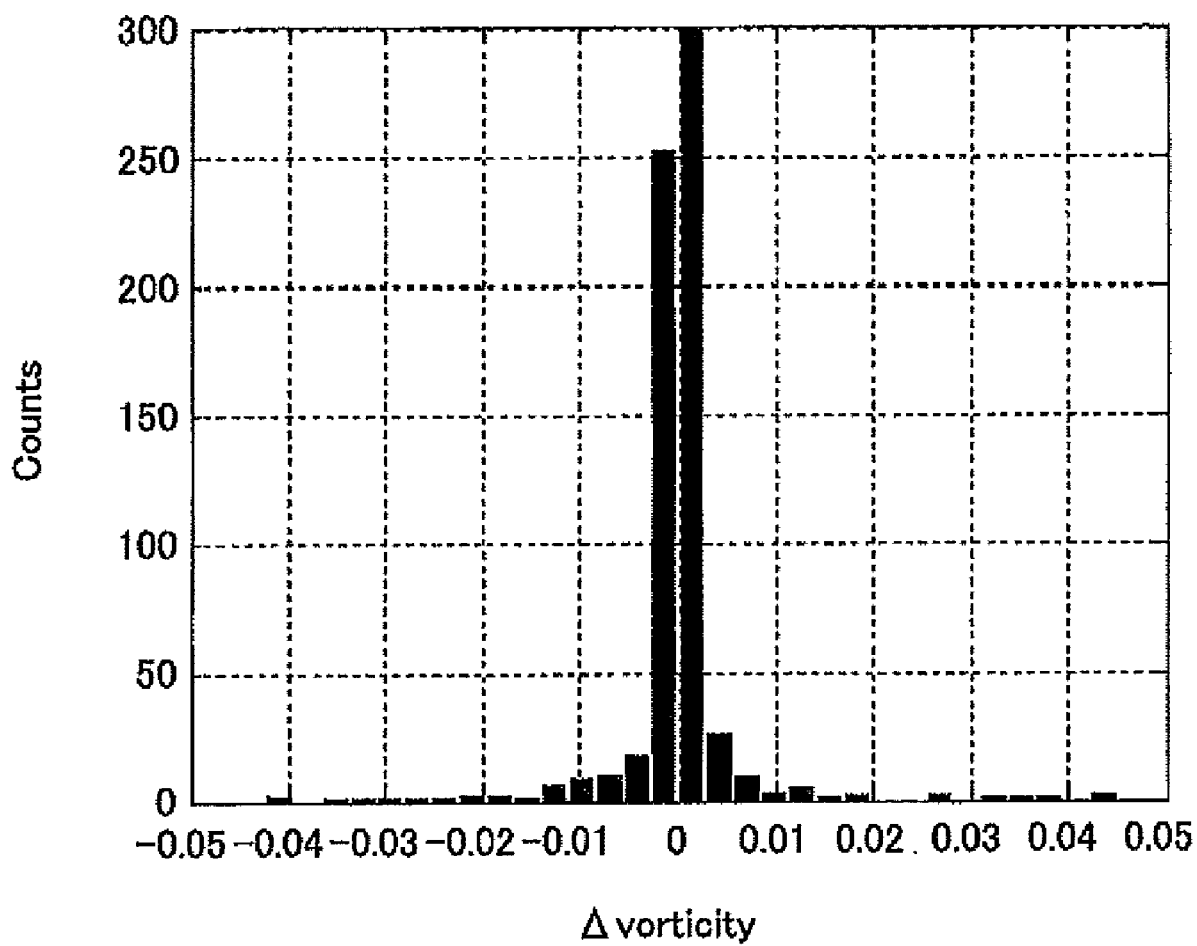
FIG. 20 is a diagram representing differences in the vorticity ω of the corresponding phase singularities before and after the rotation by a histogram.

FIG. 18 is a diagram representing differences in the angles Δθ of the corresponding phase singularities before and after the rotation by a histogram, FIG. 19 is a diagram representing the eccentricities e of the corresponding phase singularities before and after the rotation by a histogram, and FIG. 20 is a diagram representing the differences in the vorticities ω of the corresponding phase singularities before and after the rotation by a histogram.

As shown in FIGS. 18, 19 and 20, the phase singularities are concentrated in the vicinity of zero, and it may be seen that the phase singularities were reliably specified with small error.

In the above described embodiment, the phase singularities are used for the process of detecting the rotary displacement, however, it is also possible to detect the scale, shift and rotation by a simple process.

Point Matching Process

A point matching process detects a pattern after the displacement from a pattern before the displacement, using a positional relationship of a plurality of arbitrary points and a similarity of the spatial structure of the plurality of arbitrary points.

In other words, the points having a similar phase structure are regarded as candidate points, and the points which make the distances among the points within the pattern including the candidate points a minimum are determined as the pattern after the displacement.

A description will now be given of procedures of the point matching process.

First, the phase singularities are extracted by carrying out the above described filtering operation for extracting the phase singularities with respect to two intensity distribution images before and after the displacement. The real part and the imaginary part in the vicinity of the extracted phase singularities are linearly interpolated, so that the positions of all phase singularities are specified with the accuracy of the sub pixels. Furthermore, a labeling is carried out by obtaining the eccentricity e, the angle Δθ of the real axis and the imaginary axis and the vorticity ω with respect to each phase singularity having the position that is specified.

FIG. 21 is a diagram explaining the point matching process. FIG. 21(A) shows a state of the phase singularities before the displacement, and FIG. 21(B) shows a state of the phase singularities after the displacement.

First, phase singularities indicated by black dots are selected from the phase singularities shown in FIG. 21(A). The phase singularities that are selected desirably have feature parameters, including the eccentricity e, the angle Δθ of the real axis and the imaginary axis and the vorticity ω, which are clearly different from those of a large number of other phase singularities. In this case, it becomes easier to specify the phase singularities after the displacement.

As indicated by black dots in FIG. 21(B), the phase singularities corresponding to the phase singularities indicated by the black dots in FIG. 21(A) are detected, from the feature parameters and positions of the phase singularities shown in FIG. 21(A) selected from the image before the displacement and the feature parameters and positions of the phase singularities shown in FIG. 21(B) selected from the image after the displacement.

The feature parameters of the phase singularities, including the eccentricity e, the vorticity ω and the angle Δθ of the real axis and the imaginary axis, are the same before and after the displacement or, remain virtually unchanged. For this reason, it is possible to accurately measure the shift, rotation, scale and the like, by accurately specifying the phase singularities before and after the displacement.

Figure 22:
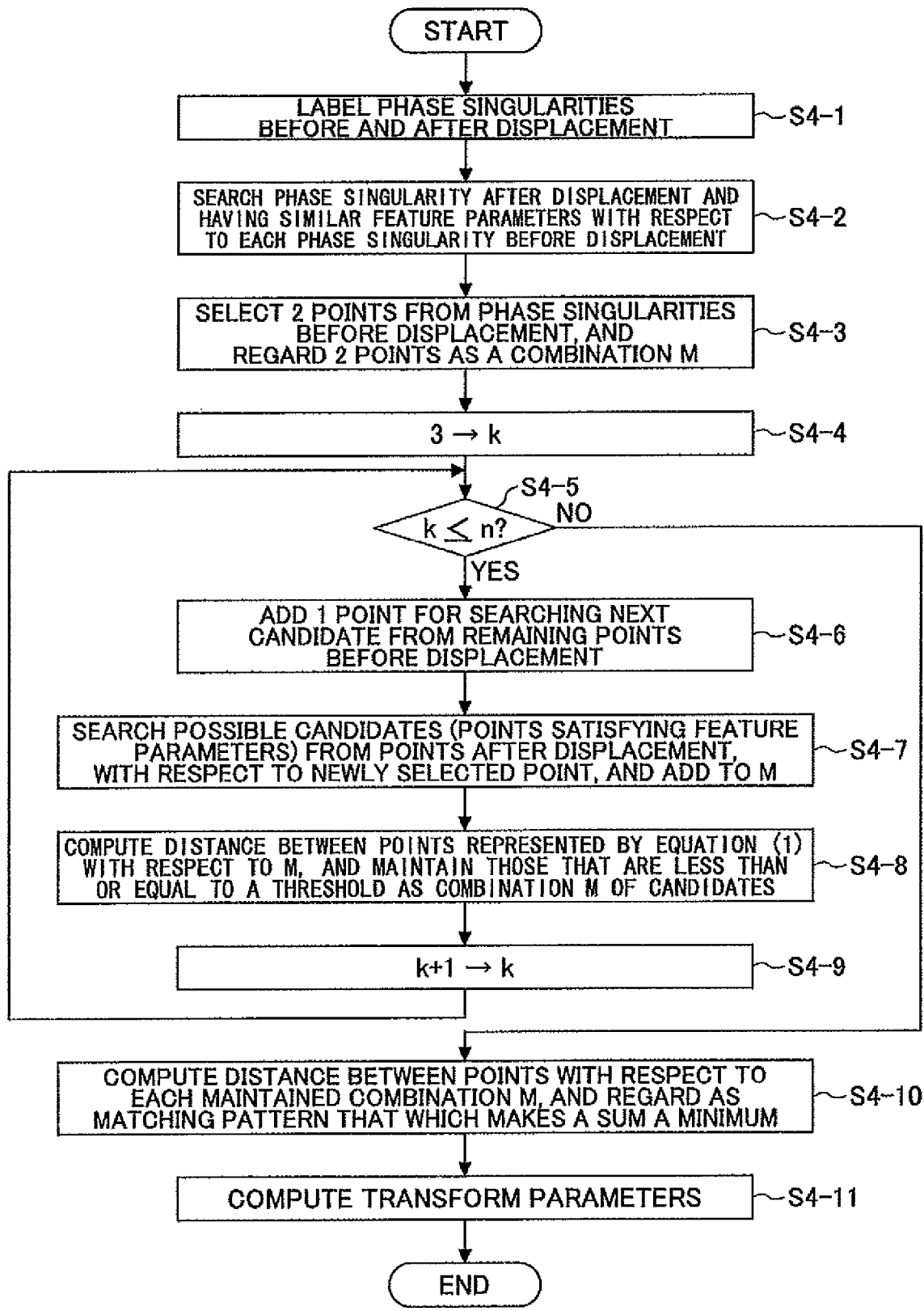
FIG. 22 is a flow chart of the point matching process.

FIG. 22 is a flow chart of the point matching process.

First, in a step S4-1, the processing unit 132 acquires and labels the phase singularities before and after the displacement, by the phase singularity acquisition process described above in conjunction with FIG. 3.

Next, in a step S4-2, the processing unit 132 searches the phase singularities having the feature parameters that are virtually the same as or, by approximation similar within a predetermined range as, those of the phase singularities before the displacement, from the phase singularities after the displacement.

Then, in a step S4-3, the processing unit 132 selects two predetermined phase singularities before the displacement, and combines the two into a combination M. In a step S4-4, the processing unit 132 substitutes "3" into a variable a.

Next, in a step S4-5, the processing unit 132 decides whether or not the variable k is smaller than a constant n. The constant n is the number of phase singularities that are searched.

Then, in a step S4-6, the processing unit 132 extracts the phase singularities which become the next search targets, from the plurality of selected phase singularities.

Next, in a step S4-7, the processing unit 132 searches the phase singularities after the displacement which have feature parameters similar by approximation to those of the newly extracted phase singularities, and adds the searched phase singularities as the combination M.

Then, in a step S4-8, the processing unit 132 carries out a computation according to the following equation (1) of Formula (10) with respect to the feature parameters of the phase singularities of the combination M, and keeps those with values less than or equal to a threshold value as promising candidates of the combination of the phase F singularities before the displacement and the phase singularities after the displacement.

Formula 10

$$\min = \sum_{1 \leq i1, i2 \leq n} (|T_{i1} - T_{i2}| - \alpha |P_{w(i1)} - P_{w(i2)}|)^2 \qquad (1)$$

In equation (1), $t_i$ and $p_{w(i)}$ respectively denote corresponding phase singularities before and after the displacement. $T=\{t_1, t_2, t_3, \ldots, t_n\}$ represent the combination of the phase singularities before the displacement. $P=\{p_1, p_2, p_3, \ldots, p_n\}$ represent the combination of the phase singularities after the displacement.

In addition, $|t_{i1}\ t_{i2}|$ represent a distance between phase singularities $t_{i1}$ and $t_{i2}$, where α represents the scale. Further, a variable w represents the corresponding relationship T→P.

The function represented by the above described equation (1) is called a cost function.

In a step S4-9, the processing unit 132 substitutes (k+1) into the variable k, and the process returns to the step 34-5. The processing unit 132 repeats the steps S4-6 through S4-9 until the variable k becomes greater than the constant n in the step S4-5.

Next, in a step S4-10, the processing unit 132 extracts, as a matching pattern, the remaining combination M having the minimum distance among the feature parameters of the phase singularities.

Then, in a step S4-11, the processing unit 132 computes transform parameters of the extracted phase singularities having the minimum distance among the feature parameters, such as the shift, the rotation and the scale, for example.

By the point matching process described above, it is possible to place the target to the positional relationships of the plurality of points and find the points which match the most before and after the displacement.

Next, a more detailed description will be given of the process of the matching algorithm described above, by referring to the drawings.

FIGS. 23, 24 and 25 are diagrams for explaining the process of the matching algorithm.

FIG. 23(A) shows a plurality of sets of phase singularities selected from the phase singularities before the displacement, which are represented by ti (i=1, . . . , n), Ti (Xi, Yi, ei, ωi, Δθi) in a T-space. FIG. 23(B) shows plurality of phase singularities after the displacement, which are represented, and by pj (j=1, . . . , k), Pj (Xj, Yj, ej, ωj, Δθj) in a P-space.

First, as indicated by black dots in FIG. 23(A), an arbitrary number of phase singularities are selected from the phase singularities before the displacement.

A difference between the eccentricity e, the zero-crossing angle θ and the vorticity ω which are the feature parameters of the phase singularities $t_i$ in the pattern before the displacement, and the eccentricity e, the zero-crossing angle θ and the vorticity ω which are the feature parameters of the phase singularities $p_j$ in the pattern after the displacement, is compared with a threshold value. This comparison is represented by the following equation of Formula 11.

$$N(t_i)=\{|e_{T_i}-e_{P_j}|\leq e_{th}, |\omega_{T_i}-\omega_{P_j}|/|\omega_{T_i}+\omega_{P_j}|\leq \omega_{th}, |\theta_{T_i}-\theta_{P_j}|\leq \theta_{th}\} \ldots (2)$$ Formula 11

In the equation (2), the second term $|\omega_{T_i}+\omega_{P_j}|$ in the denominator is added for normalization purposes. This format is used within the actual program. $e_{th}$ denotes the threshold value of the eccentricity, $\theta_{th}$ denotes the threshold value of the zero-crossing angle, and $\omega_{th}$ denotes the threshold value of the vorticity.

Next, a matching is carried out between the sets of the phase singularities within the T-space and the sets of the phase singularities within the P-space.

In FIG. 24, a circular mark indicated by a solid line indicates the positive phase singularity, and a circular mark indicated by a dotted line indicates the negative phase singularity.

First, based on the polarity, that is, a sign indicating positive or negative, and the positional relationship of the two phase singularities within the T-space shown in FIG. 24(A), a set formed by two phase singularities which have the possibility of existing within the P-space as indicated by straight dotted lines in FIG. 24(B) is searched.

This matching not only takes into consideration the shift and the rotation, but also takes into consideration the scale. Hence, the combinations with which the first two phase singularities within the T-space are selected from the phase singularities within the P-spacer amounts to all combinations of the positive phase singularities and the negative phase singularities, which are 42 in this example because there are 7 positive phase singularities and 6 negative phase singularities.

The positive phase singularity refers to the phase singularity having the vorticity, which is the feature parameter, with a positive value, while the negative phase singularity refers to the phase singularity having the vorticity with a negative value.

With respect to the obtained combination of the phase singularities, those combinations not satisfying the conditions of the feature parameters of the phase singularities are discarded. By taking into consideration the fact that the feature parameters easily change under experimenting environments, it is preferable to relax the conditions. The conditions in this case are the threshold values $e_{th}$, $\theta_{th}$ and $\omega_{th}$ of the equation (2) described above.

Next, two phase singularities $t_{i1}$ and $t_{i2}$ within the T-space are selected in the step S4-3. The phase singularities $t_{i1}$ and $t_{i2}$ at least have one matching candidate. The phase singularity $t_{i1}$ has $n_1$ matching candidates, and the phase singularity $t_{i2}$ has $n_2$ matching candidates. Accordingly, it may be seen that there are $n_1 n_2$ combinations of the candidates within the P-space after the displacement. This matching will be referred to as a temporal matching.

Next, the phase singularities within the T-space are increased by one as shown in FIG. 25, and a third possible candidate within the P-space is searched. Hence, the combination including this third candidate is obtained. The phase singularity which is obtained using the feature parameters but is obviously in error, may be excluded. Such an operation is repeated until n phase singularities are selected within the T-space.

In other words, the temporal matching is repeated, while adding new matching points, until the matching point is finally determined with respect to all phase singularities.

In order to carry out this operation, it is necessary to check whether or not the geometrical structural relationship of the newly added points has a similarity before and after the displacement.

According to the equation (1), the similarity of the temporal matching is checked, and at the same time, the threshold value of the distance is used to exclude the matching point which is detected erroneously.

The matching is carried out by selecting, from the combination M of the phase singularities that are finally obtained, the phase singularities which make the sum total of the differences between the spatial distances among the phase singularities within the P-space corresponding to the distances among all of the phase singularities in the T-space, and the distances of the phase singularities, a minimum, by the evaluation equation (1).

A description will further be made by referring to the drawings.

Figure 26:
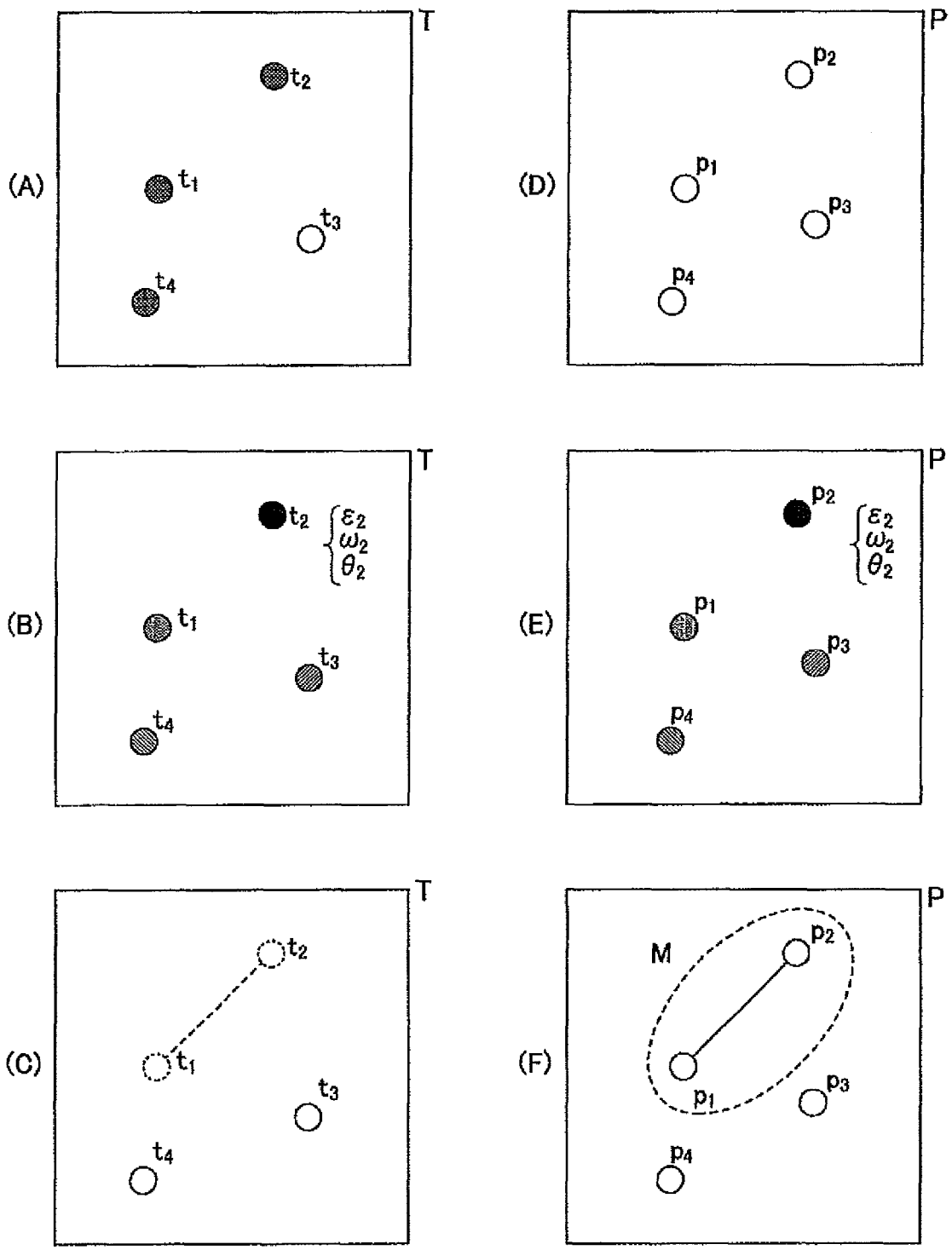
FIG. 26 is diagram of an amplitude characteristic of a LG filter used for experiment and inspection.
Figure 27:
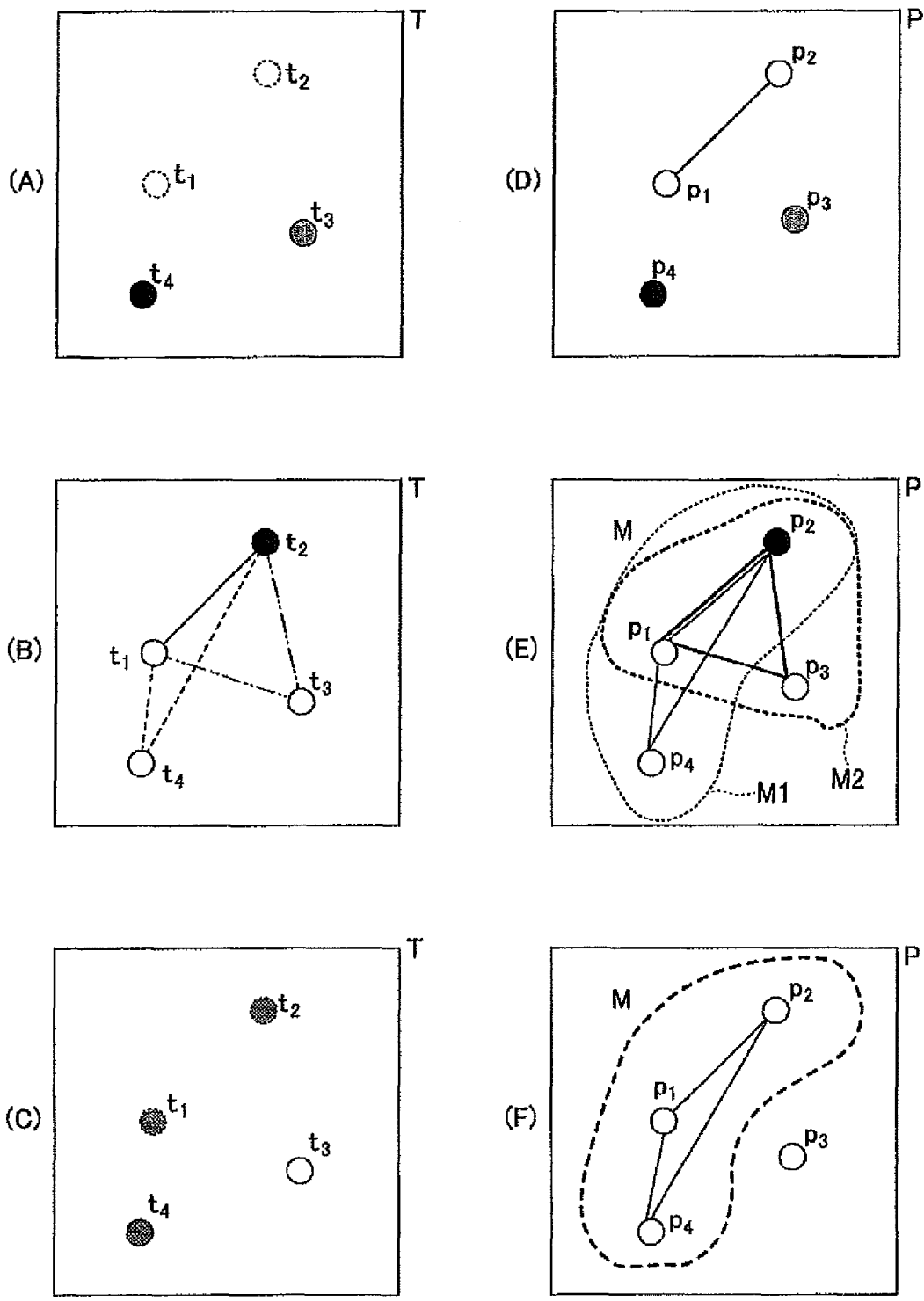
FIG. 27 is a diagram explaining the matching process.

FIGS. 26 and 27 are diagrams explaining the matching process. FIGS. 26(A) through 26(C) and FIGS. 27(A) through 27(C) show distributions of the phase singularities before the displacement, that is, the distributions of the phase singularities in the T-space, and FIGS. 26(D) through 26(D) and FIGS. 27(D) through 27(F) show distributions of the phase singularities after the displacement, that is, the distributions of the phase singularities within the P-space.

First, the feature parameters of the phase singularities within the T-space and the P-space are computed as shown in FIGS. 26(A) and 26(D), and the target points are selected. In FIG. 26(A), a combination of t1, t2 and t4 is selected.

Next, candidates P1 through P4 within the P-space, which have feature parameters similar to those of the phase singularities within the T-space, are searched as shown in FIGS. 26(B) and 26(E).

Then, two phase singularities t1 and t2 within the T-space are selected, and the corresponding two phase singularities p1 and p2 within the P-space are selected, as shown in FIGS. 26(C) and 26(F), to form the combination M.

Next, phase singularities t3 and t4, which are other than the already selected phase singularities and become candidates, and corresponding phase singularities p3 and p4 within the P-space, are searched as shown in FIGS. 27(A) and 27(D).

Then, the feature parameters of the phase singularities t1, t2 and t4 within the T-space and the phase singularities p1, p2 and p4 within the P-space are substituted into the equation (1), and the value of the equation (1) is computed as shown in FIGS. 28(B) and 27(E). Similarly, the feature parameters of the target phase singularities t1, t2 and t4 within the T-space and the feature parameters of the phase singularities p1, p2 and p3 within the P-space are substituted into the equation (1), and the value of the equation is computed.

The sets of the phase singularities for which the computed results are smaller than a threshold value are extracted. For example, it is assumed in this example that a combination M1(p1, p2, p4) and a combination M2(p1, p2, p3) are extracted. The extracted combinations M1 and M2 of the phase singularities are extracted as combinations subjected to the matching.

Next, of the combinations M1 and M2 subjected to the matching, the combination M1 having the lowest cost, that is, the lowest computed value for the equation (1), is extracted as the matching combination, as shown in FIG. 27(F).

For the sake of convenience, the example described above takes into consideration a case where the number of target phase singularities is three, but it is of course possible to carry out similar processes when the number of target phase singularities is more than three.

Next, a description will be given of the transform parameters computed in the step S4-11. In other words, a description will be given of the decomposition of the shift of the phase singularity into the three parameters which are the transition, rotation and scale.

Generally, from the point of view of fluid mechanics, it is known that any complicated motion can be represented by the transition, rotation and scale, and the rotation relational expression of the coordinates before and after the displacement may be represented by the following Formula 12.

$$x'_i - \overline{x'_i} = \alpha \cos\theta(x_i - \overline{x}) + \alpha \sin\theta(y_i - \overline{y}_i),$$

$$y'_i - \overline{y'_i} = -\alpha \sin\theta(x_i - \overline{x}) + \alpha \cos\theta(y_i - \overline{y}_i), \quad \text{Formula 12}$$

(x, y) denotes a coordinate of the phase singularity before the displacement, (x', y') denotes a coordinate of the phase singularity after the displacement, α denotes the scale factor, and θ denotes the rotation angle.

Formula 13 represents the center of gravity of the phase singularity before the displacement.

$$\overline{x} = \sum_i x_i / N, \ \overline{y} = \sum_i y_i / N \quad \text{Formula 13}$$

Formula 14 represents the center of gravity of the phase singularity after the displacement.

$$\overline{x'_i} = \sum_i x'_i / N, \ \overline{y'_i} = \sum_i y'_i / N \quad \text{Formula 14}$$

First, a description will be given of a function suited for representing the matching.

This function may be written as a summation of the differences of the corresponding phase singularities before and after the displacement.

$$E = \sum_i \{[x'_i - \overline{x'} - C(x_i - \overline{x}) - S(y_i - \overline{y})]^2 + [y'_i - \overline{y'} + S(x_i - \overline{x}) - C(y_i - \overline{y})]^2\} \quad \text{Formula 15}$$

In this case, C=α cos θ and S=α sin θ. Parameters must first be computed in order to find a minimum value for the value E.

An example of such parameters is as follows.

$$\partial E/\partial C = 0, \partial E/\partial S = 0 \quad \text{Formula 16}$$

Suppose the following.

$$x_i' = x'_i - \overline{x'},$$

$$x_i = x_i - \overline{x}$$

$$y_i' = y'_i - \overline{y'},$$

$$y_i = y_i - \overline{y} \quad \text{Formula 17}$$

Then, the following Formula 19 can be obtained from Formula 18.

$$\partial E/\partial C = 0 \quad \text{Formula 18}$$

$$\sum_i (x'_i - Cx_i - Sy_i)(-x_i) + \sum_i (y'_i + Sx_i - Cy_i)(y_i) = 0. \quad \text{Formula 19}$$

Formula 20 is obtained by solving Formula 19.

$$C = \frac{\sum_i (x'_i x_i + y'_i y_i)}{\sum_i (x_i^2 + y_i^2)}. \quad \text{Formula 20}$$

Similarly, the following Formula 22 can be obtained from Formula 21.

$$\partial E/\partial S = 0 \quad \text{Formula 21}$$

$$\sum_i (x'_i - Cx_i - Sy_i)(-y_i) + \sum_i (y'_i + Sx_i - Cy_i)(x_i) = 0 \quad \text{Formula 22}$$

The following Formula 23 can be obtained by solving Formula 22.

$$S = \frac{\sum_i (x'_i y_i - x_i y'_i)}{\sum_i (x_i^2 + y_i^2)}. \quad \text{Formula 23}$$

The following parameters can be obtained from the definitions of S and C.

$$\alpha = \sqrt{S^2 + C^2},$$

$$\theta = \arctan(S/C),$$

$$\Delta x = \overline{x'} - \overline{x},$$

$$\Delta y = \overline{y'} - \overline{y}. \quad \text{Formula 24}$$

Therefore, it may be seen that the shift of the phase singularity can be represented by the three parameters, namely, the transition Δx and Δy, the rotation θ, and the scale factor α. These three parameters are referred to as the transform parameters which are computed in the step S4-11.

Experiment and Inspection

Next, a description will be given of the experiment and inspection results of the matching process described above.

Figure 28:
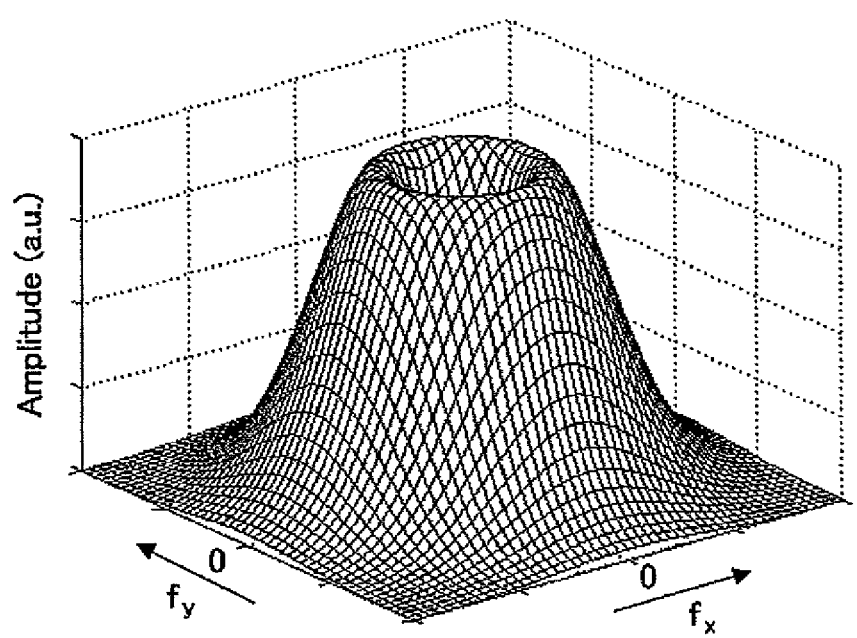
FIG. 28 is a diagram explaining the matching process.
Figure 29:
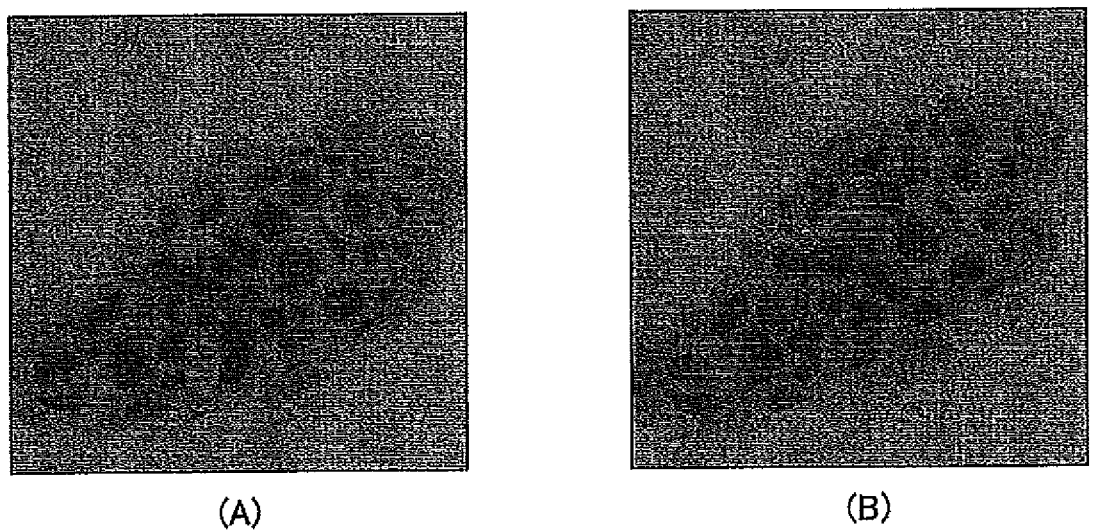
FIG. 29 is a diagram for explaining results of experiment and inspection.
Figure 30:
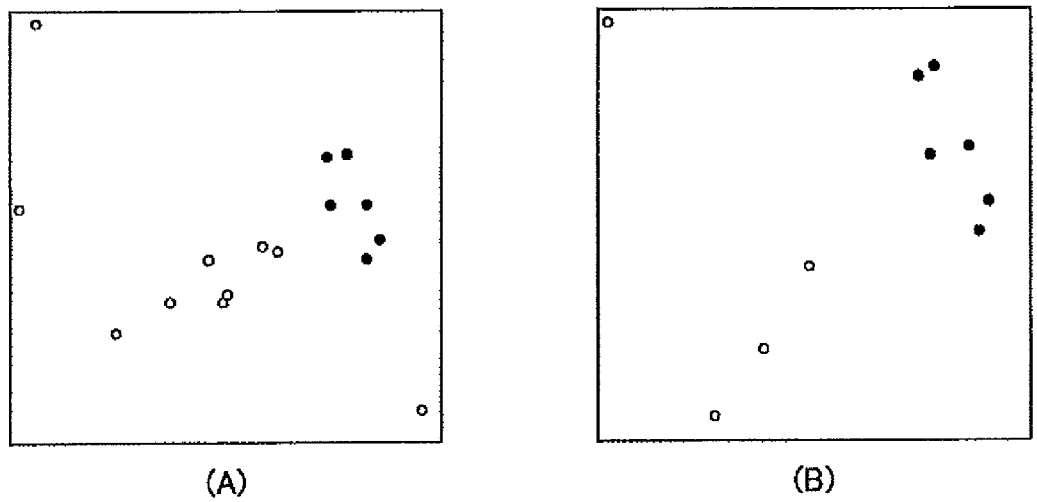
FIG. 30 is a diagram for explaining the results of the experiment and inspection.
Figure 31:
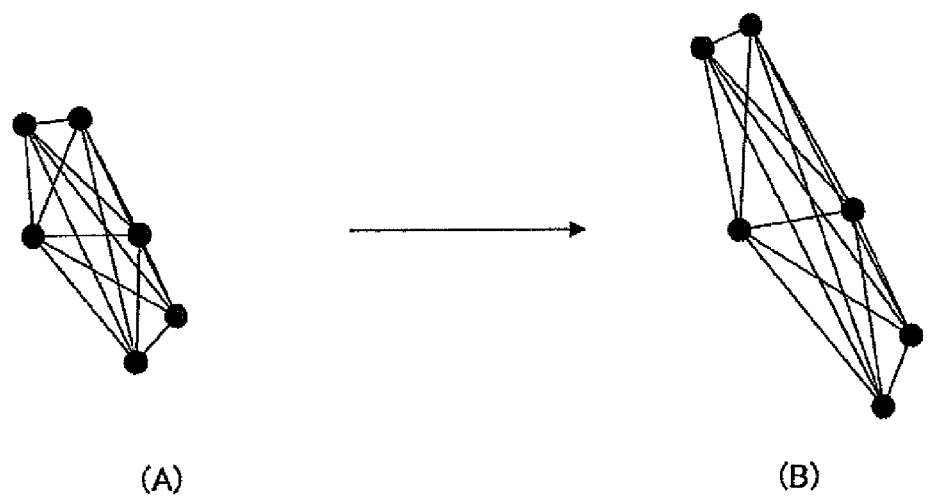
FIG. 31 is a diagram for explaining the results of the experiment and inspection.

FIG. 28 is a diagram showing an amplitude characteristic of a LG filter used for the experiment and inspection, and FIGS. 29 through 35 are diagrams for explaining the results of the experiment and inspection. FIG. 29 is a diagram showing images of the experiment. FIG. 29(A) shows an image before the displacement, and FIG. 29(B) shows an image after the displacement. FIG. 30 is a diagram showing images of the phase singularities extracted from the images shown in FIG. 29. FIG. 29(A) shows a distribution of the phase singularities before the displacement, and FIG. 29(B) shows a distribution of the phase singularities after the displacement. FIG. 31 is a diagram showing the selected phase singularities on an enlarged scale. FIG. 31(A) shows an enlarged View for the case before the displacement, and FIG. 31(B) shows an enlarged view for the case after the displacement.

First, in the experiment, a green swellfish was used as the target, and the matching process was inspected using images that were picked by seriography using a high-speed CCD camera at a rate of 30 pictures per second.

A LG filter operation was carried out with respect to the picked up images, to obtain the phase singularities. A filter width of the LG filter was set to $\omega^2=30$. The LG filter is a spiral phase filter added with the characteristic of a bandpass filter, and the LG filter used had an amplitude characteristic shown in FIG. 28. The wider the amplitude width $\omega$ of the LG filter, the larger the number of phase singularities that appear, and the number of phase singularities that appear becomes smaller when the amplitude width 6 of the LG filter becomes narrower.

A description will be given of an example where the matching algorithm of this embodiment is applied with the respect to the image shown in FIG. 29 before the displacement. The distributions of the phase singularities before and after the displacement for the images shown in FIG. 29 become as shown in FIG. 30. The matching process was carried out by selecting six phase singularities indicated by black dots from the phase singularities before the displacement shown in FIG. 30(A).

In FIG. 30(BD) the phase singularities indicated by black dots correspond to the phase singularities before the displacement indicated by the black dots, and has the pattern which is actually detected by the matching algorithm.

FIG. 31 is an enlarged view of the combination of the phase singularities selected before the displacement and the combination of the phase singularities after the displacement detected by the point matching algorithm. It was inspected by the matching algorithm whether or not a deformation has occurred in the combination of the transition, rotation and scale, by comparing the patterns before and after the displacement.

Results were also inspected for a case where the point matching process of this embodiment is employed by targeting on different patterns with F respect to two different images.

FIG. 32 is a diagram showing distributions of the phase singularities before and after the displacement, for the case where the point matching process of this embodiment is employed by targeting on different patterns with respect to two different images. FIG. 32(A) shows the distribution of the phase singularities before the displacement, and FIG. 32(B) shows the distribution of the phase singularities after the displacement. FIG. 33 is a diagram showing displacements of the phase singularities shown in FIG. 32. FIG. 33(B) is an enlarged view of the selected phase singularities.

In this inspection example, it was also confirmed that the four phase singularities before the displacement shown in FIG. 32(A) shift to the positions shown in FIG. 32(B), and the four target phase singularities are displaced as shown in FIG. 33.

Furthermore, the same operation was carried out with respect to 100 seriography images of the swellfish.

Figure 35:
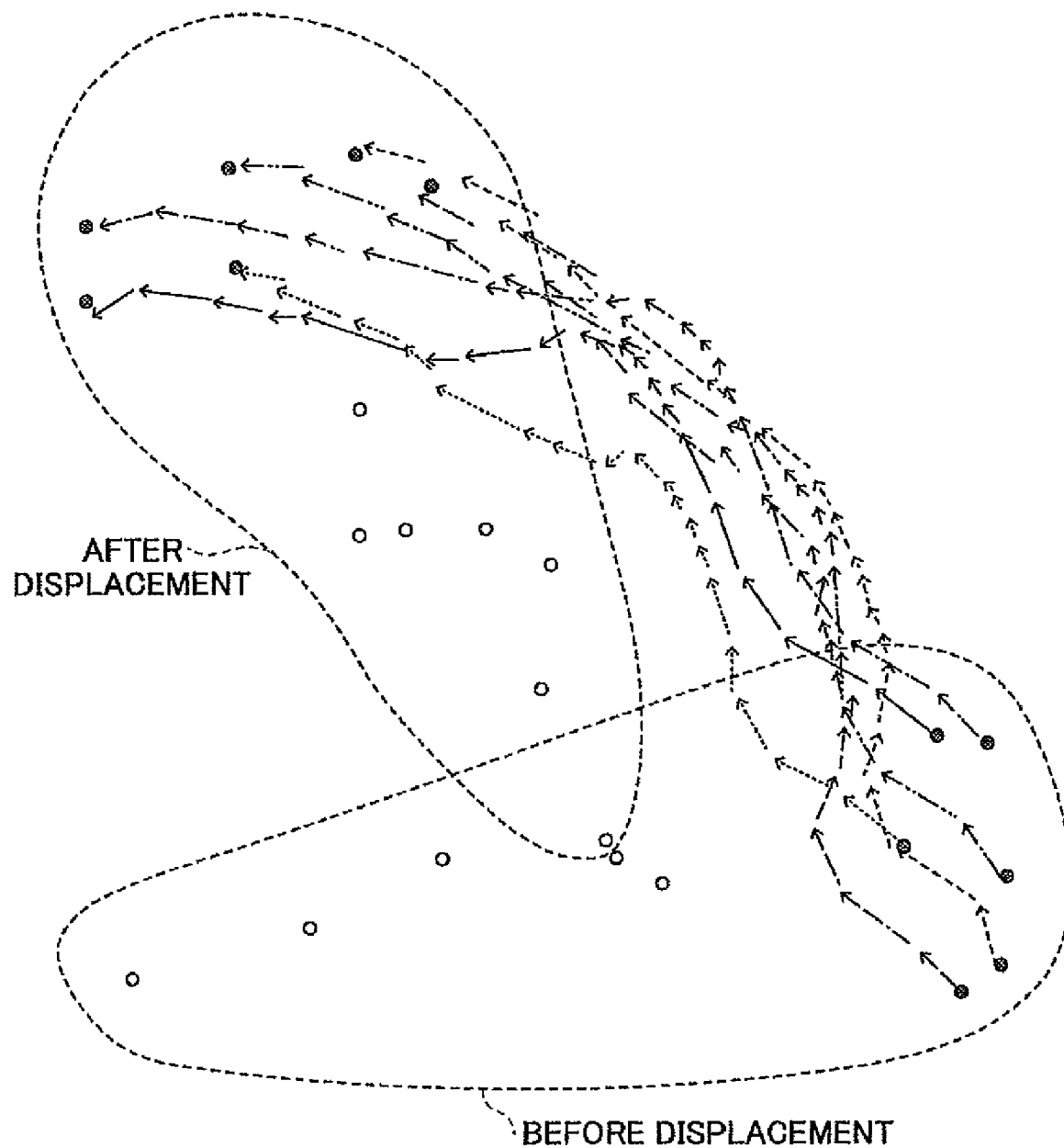
FIG. 35 is a diagram for explaining the results of the experiment and inspection.

FIG. 34 is a diagram showing images for a case where the experiment and inspection were conducted with respect to the seriography images. FIG. 34(A) shows the first image, and FIG. 34(B) shows the last image. FIG. 35 shows tracking loci for six target phase singularities of the images shown in FIG. 34.

By using the point matching process of this embodiment, it becomes possible to continuously track the phase singularities.

In addition, it may be seen that a random motion can be tracked, by detecting the set of corresponding phase singularities from the phase structure of the phase singularities and the distances of the phase singularities from other phase singularities, with respect to an arbitrary combination of the phase singularities, and tracking the detected set of the phase singularities. Hence, it becomes possible to measure a large displacement of an object which could not be measured because the feature parameters change.

This embodiment carries out the matching by detecting from the sets of the phase singularities the combination which makes the value of the equation (1) a minimum. However, it is of course possible to carry out the matching by computing the difference of the sum total distances between points among the phase singularities, and detecting the phase singularity which makes the difference of the sum total distances between points a minimum between the pattern before the displacement and the pattern after the displacement.

Figure 36:
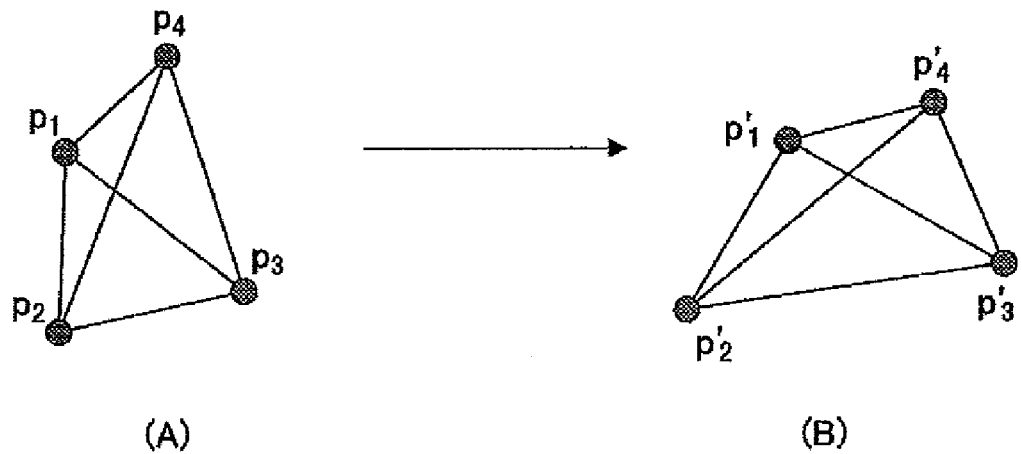
FIG. 36 is a diagram for explaining a matching operation using a difference of sum total distances between points.
Figure 37:
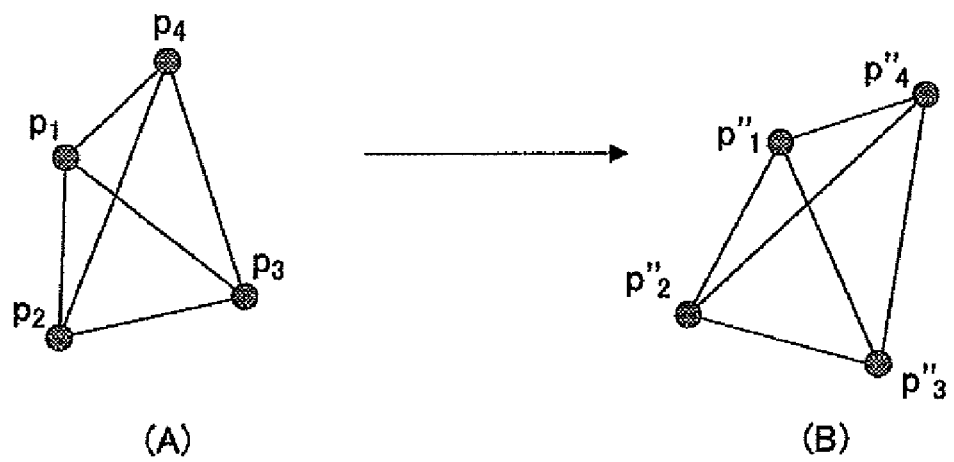
FIG. 37 is a diagram for explaining the matching operation using the difference of the sum total distances between the points.

FIGS. 36 and 37 are diagrams for explaining the matching operation using the difference of the sum total distances between points.

FIGS. 36(A) and 37(A) show distributions of the phase singularities before the displacement, and FIGS. 36(B) and 37(A) show distributions of the phase singularities after the displacement.

First, phase singularities $p_1$ through $p_4$ are extracted from the image before the displacement, phase singularities $p'_1$, $p'_2$, $p'_4$ and $P'_5$ are extracted from the image after the displacement, and a difference $S_1$ of the sum total distances between points is obtained between the phase singularities $p_1$ through $p_{4t}$ before the displacement and the phase singularities $p'_1$, $p'_2$, $p'_4$ and $p'_5$ after the displacement. The difference $S_1$ of the sum total distances between points is obtained from the following.

$$S_1=(|p_1p_3|-p'_1p'_5|)^2+(|p_1p_2|-|p'_1p'_2|)^2+(|p_2p_3|-|p'_2p'_5|)^2+(|p_4p_3|-|p'_4p'_5|)^2+(|p_1p_4|-|p'_1p'_4|)^2+(|p_2p_4|-|p'_2p'_4|)^2$$

In addition, phase singularities $p''_1$, $p''_2$, $p''_4$ and $p''_5$ which are different from the phase singularities $p'_1$, $p'_2$, $p'_4$ and $p'_5$ are extracted from the image after the displacement, and a difference $S_2$ of the sum total distances between points is obtained between the phase singularities $p_1$ through $p_{4t}$ before the displacement and the phase singularities $p''_1$, $p''_2$, $p''_4$ and $p''_5$ after the displacement. The difference $S_2$ of the sum total distances between points is obtained from the following.

$$S_2=(|p_1p_4|-|p''_1p''_4|)^2+(|p_1p_2|-|p''_1p''_2|)^2+(|p_2p_3|-|p''_2p''_3|)^2+(|p_3p_4|-|p''_3p''_4|)^2+(|p_1p_3|-|p''_1p''_3|)^2+(|p_2p_4|-|p''_2p''_4|)^2$$

If $S_2<S_1$, for example, it is judged that the phase singularities $p_1$ through $p_4$ from the image before the displacement correspond to the phase singularities $p''_1$, $p''_2$, $p''_4$ and $p''_5$.

For the sake of convenience, the example described above takes into consideration a case where the number of target phase singularities is four, but it is of course possible to carry out the matching using the difference of the sum total distances between points as long as the number of target phase singularities is two or more.

The point matching process of this embodiment uses the positional relationships of the plurality of phase singularities, and for this reason, even if the positional relationships do not match exactly before and after the displacement, such as the scale, transition and rotation, it is possible to select the set having the closest match by carrying out the point matching process. Hence, the present invention may be used to measure various displacements.

In this embodiment, the phase singularities having, as the feature parameters, the position information, the eccentricity, the vorticity, and the zero-crossing angle which is the intersecting angle of the real axis and the imaginary axis, are used as the feature points. However, the feature points are not limited to such, and it is possible to use only the position information, for example.

Therefore, this embodiment makes the intensity information of the spatially random pattern correspond to the position information without the use of an interferometer, and specifies where each phase singularity before the displacement shifted after the displacement based on the features of all phase singularities existing within the phase information. Hence, this embodiment can provide a displacement detection apparatus that may be applied with respect to the displacement measurement of the entire measuring object, and also with respect to the displacement measurement in the local region of the object, and further realize measurement of a rotation of a field.

This International Application claims the benefit of a Japanese Patent Application No. 2006-024846 filed Feb. 1, 2006 and a Japanese Patent Application No. 2006-303238 filed Nov. 8, 2006, in the Japanese Patent Office, the disclosure of which is hereby incorporated by reference.

The invention claimed is:

1. A displacement detection method to be implemented in a computer, comprising:
   a Fourier transform procedure causing the computer to subject an intensity signal of an acquired image to a Fourier transform to obtain a Fourier transformed signal;
   a procedure causing the computer to carry out a filtering process which destroys an Hermitian symmetry of the Fourier transformed signal to obtain a filtered Fourier transformed signal;
   a procedure causing the computer to obtain a complex analytic signal by carrying out an inverse Fourier transform on the filtered Fourier transformed signal;
   a phase singularity acquiring procedure causing the computer to acquire a phase singularity where values of both a real part and an imaginary part of the complex analytic signal become zero;
   a phase singularity specifying procedure causing the computer to acquire predetermined feature parameters from a phase structure of the phase singularity and to specify the phase singularity based on the feature parameters; and
   a displacement detecting procedure causing the computer to detect a displacement by detecting a position of the phase singularity after the displacement based on the feature parameters acquired by the phase singularity specifying procedure.

2. The displacement detection method as claimed in claim 1, wherein the feature parameters acquired by the phase singularity specifying procedure include an angle at which a line segment making a real part zero and a line segment making an imaginary part zero intersect when values of the real part and the imaginary part of the complex analytic signal in a vicinity of the phase singularity are interpolated with a plane.

3. The displacement detection method as claimed in claim 1, wherein the feature parameters acquired by the phase singularity specifying procedure include an eccentricity of a shape of an intensity distribution of the complex analytic signal in a vicinity of the phase singularity.

4. The displacement detection method as claimed in claim 1, wherein the feature parameters acquired by the phase singularity specifying procedure include a vector product of a gradient of the real part of the complex analytic signal in a vicinity of the phase singularity and a gradient of the imaginary part of the complex analytic signal.

5. The displacement detection method as claimed in claim 1, wherein the feature parameters acquired by the phase singularity specifying procedure include an angle at which a line segment making a real part zero and a line segment making an imaginary part zero intersect when values of the real part and the imaginary part of the complex analytic signal in a vicinity of the phase singularity are interpolated with a plane, an eccentricity of a shape of an intensity distribution of the complex analytic signal in the vicinity of the phase singularity, and a voracity which is a vector product of a gradient of the real part of the complex analytic signal in a vicinity of the phase singularity and a gradient of the imaginary part of the complex analytic signal.

6. The displacement detection method as claimed in claim 1, wherein the displacement detecting procedure further comprises:
   a position detecting procedure causing the computer to specify positions of the phase singularities before and after the displacement and specified by the phase singularity specifying procedure based on the feature parameters; and
   a displacement measuring procedure causing the computer to measure displacements of the phase singularities based on the positions of the phase singularities before and after the displacement and detected by the position detecting procedure.

7. The displacement detection method as claimed in claim 6, wherein the displacement measuring procedure further comprises:
   a rotation center acquiring procedure causing the computer to acquire, as a center of rotation, a point where a sum of distances among a plurality of normal bisectors of line segments connecting the positions of a plurality of sets of phase singularities before and after the displacement and detected by the position detecting procedure becomes a minimum; and
   a rotation angle acquiring procedure causing the computer to acquire, as a rotation angle, an angle of sides sandwiching a center of rotation of a triangle which is defined by the positions of the phase singularities before and after the displacement and detected by the position detecting procedure and the center of rotation acquired by the rotation center acquiring procedure.

8. The displacement detection method as claimed in claim 1, wherein the filtering process includes carrying out a process using a Laguerre-Gaussian beam filter characteristic having a spiral phase characteristic with the phase singularity at the center with respect to the Fourier transformed signal and having a donut-shaped amplitude characteristic.

9. A displacement detection device comprising:
   a Fourier transform means for subjecting an intensity signal of an acquired image to a Fourier transform to obtain a Fourier transformed signal;
   a means for carrying out a filtering process which destroys an Hermitian symmetry of the Fourier transformed signal to obtain a filtered Fourier transformed signal;
   a means for obtaining a complex analytic signal by carrying out an inverse Fourier transform on the filtered Fourier transformed signal;
   a phase singularity acquiring means for acquiring a phase singularity where values of both a real part and an imaginary part of the complex analytic signal become zero;
   a phase singularity specifying means for acquiring predetermined feature parameters from a phase structure of the phase singularity and for specifying the phase singularity based on the feature parameters; and a displacement detecting means for detecting a displacement by detecting a position of the phase singularity after the displacement based on the feature parameters acquired by the phase singularity specifying means.

10. The displacement detection device as claimed in claim 9, wherein the feature parameters acquired by the phase singularity specifying means include an angle at which a line segment making a real part zero and a line segment making an imaginary part zero intersect when values of the real part and the imaginary part of the complex analytic signal in a vicinity of the phase singularity are interpolated with a plane.

11. The displacement detection device as claimed in claim 9, wherein the feature parameters acquired by the phase singularity specifying means include an eccentricity of a shape of an intensity distribution of the complex analytic signal in a vicinity of the phase singularity.

12. The displacement detection device as claimed in claim 9, wherein the feature parameters acquired by the phase singularity specifying means include a vector product of a gradient of the real part of the complex analytic signal in a vicinity of the phase singularity and a gradient of the imaginary part of the complex analytic signal.

13. The displacement detection device as claimed in claim 9, wherein the feature parameters acquired by the phase singularity specifying means include an angle at which a line segment making a real part zero and a line segment making an imaginary part zero intersect when values of the real part and the imaginary part of the complex analytic signal in a vicinity of the phase singularity are interpolated with a plane, an eccentricity of a shape of an intensity distribution of the complex analytic signal in the vicinity of the phase singularity, and a vorticity which is a vector product of a gradient of the real part of the complex analytic signal in the vicinity of the phase singularity and a gradient of the imaginary part of the complex analytic signal.

14. The displacement detection device as claimed in claim 9, wherein the displacement measuring means comprises:
  a position detecting means for specifying positions of the phase singularities before and after the displacement and specified by the phase singularity specifying means based on the feature parameters;
  a displacement measuring means for measuring displacements of the phase singularities based on the positions of the phase singularities before and after the displacement and detected by the position detecting means;
  a rotation center acquiring means for acquiring, as a center of rotation, a point where a sum of distances among a plurality of normal bisectors of line segments connecting the positions of a plurality of sets of phase singularities before and after the displacement and detected by the position detecting means becomes a minimum; and
  a rotation angle acquiring means for acquiring, as a rotation angle, an angle of sides sandwiching a center of rotation of a triangle which is defined by the positions of the phase singularities before and after the displacement and detected by the position detecting means and the center of rotation acquired by the rotation center acquiring means.

15. The displacement detection device as claimed in claim 9, wherein the filtering means carries out a process using a Laguerre-Gaussian beam filter characteristic having a spiral phase characteristic with the phase singularity at the center with respect to the Fourier transformed signal and having a donut-shaped amplitude characteristic.

16. A non-transitory computer-readable storage medium which stores a displacement detection program which, when executed by a computer, causes the computer to perform a process comprising:
  a Fourier transform procedure causing the computer to subject an intensity signal of an acquired image to a Fourier transform to obtain a Fourier transformed signal;
  a procedure causing the computer to carry out a filtering process which destroys an Hermitian symmetry of the Fourier transformed signal to obtain a filtered Fourier transformed signal;
  a procedure causing the computer to obtain a complex analytic signal by carrying out an inverse Fourier transform on the filtered Fourier transformed, signal;
  a phase singularity acquiring procedure causing the computer to acquire a phase singularity where values of both a real part and an imaginary part of the complex analytic signal become zero;
  a phase singularity specifying procedure causing the computer to acquire predetermined feature parameters from a phase structure of the phase singularity and to specify the phase singularity based on the feature parameters; and
  a displacement detecting procedure causing the computer to detect a displacement by detecting a position of the phase singularity after the displacement based on the feature parameters acquired by the phase singularity specifying procedure.

17. The non-transitory computer-readable storage medium as claimed in claim 16, wherein the filtering process includes carrying out a process using a Laguerre-Gaussian beam filter characteristic having a spiral phase characteristic with the phase singularity at the center with respect to the Fourier transformed signal and having a donut-shaped amplitude characteristic.

18. A feature point matching method to be implemented in a computer, comprising:
  a Fourier transform procedure causing the computer to subject an intensity signal of an acquired image to a Fourier transform to obtain a Fourier transformed signal;
  a procedure causing the computer to carry out a filtering process which destroys an Hermitian symmetry of the Fourier transformed signal to obtain a filtered Fourier transformed signal;
  a procedure causing the computer to obtain a complex analytic signal by carrying out an inverse Fourier transform on the filtered Fourier transformed signal;
  a phase singularity acquiring procedure causing the computer to acquire a phase singularity where values of both a real part and an imaginary part of the complex analytic signal become zero;
  a phase singularity specifying procedure causing the computer to acquire predetermined feature parameters from a phase structure of the phase singularity and to specify the phase singularity based on the feature parameters; and
  a procedure causing the computer to detect a position of the phase singularity after a displacement based on the feature parameters acquired by the phase singularity specifying procedure,
  wherein a phase singularity after the displacement and corresponding to a phase singularity before the displacement is searched based on a difference between feature parameters of the phase singularity before the displacement and feature parameters of the phase singularity after the displacement, and the phase singularity after the displacement and corresponding to the phase singularity before the displacement is subjected to a matching, from a similarity of geometrical structural relationships of the phase singularities.

19. The feature point matching method as claimed in claim 18, wherein the phase singularities include, as the feature parameters, position information, an eccentricity of a shape of an intensity distribution of the complex analytic signal in a vicinity of the phase singularity, a vorticity which is a vector product of a gradient of the real part of the complex analytic signal in the vicinity of the phase singularity and a gradient of the imaginary part of the complex analytic signal, and an angle at which a line segment making the real part of the complex analytic signal in the vicinity of the phase singularity zero and a line segment making the imaginary part of the complex analytic signal zero intersect.

20. A non-transitory computer-readable storage medium which stores a phase singularity matching program which, when executed by a computer, causes the computer to perform a process comprising:

a Fourier transform procedure causing the computer to subject an intensity signal of an acquired image to a Fourier transform to obtain a Fourier transformed signal;

a procedure causing the computer to carry out a filtering process which destroys an Hermitian symmetry of the Fourier transformed signal to obtain a filtered Fourier transformed signal;

a procedure causing the computer to obtain a complex analytic signal by carrying out an inverse Fourier transform on the filtered Fourier transformed signal;

a phase singularity acquiring procedure causing the computer to acquire a phase singularity where values of both a real part and an imaginary part of the complex analytic signal become zero;

a phase singularity specifying procedure causing the computer to acquire predetermined feature parameters from a phase structure of the phase singularity and to specify the phase singularity based on the feature parameters; and a procedure causing the computer to detect a position of the phase singularity after a displacement based on the feature parameters acquired by the phase singularity specifying procedure, wherein a phase singularity after the displacement and corresponding to a phase singularity before the displacement is searched based on a difference between feature parameters of the phase singularity before the displacement and feature parameters of the phase singularity after the displacement, and the phase singularity after the displacement and corresponding to the phase singularity before the displacement is subjected to a matching, from a similarity of geometrical structural relationships of the phase singularities, and the phase singularities include, as the feature parameters, position information, an eccentricity of a shape of an intensity distribution of the complex analytic signal in a vicinity of the phase singularity, a voracity which is a vector product of a gradient of the real part of the complex analytic signal in the vicinity of the phase singularity and a gradient of the imaginary part of the complex analytic signal, and an angle at which a line segment making the real part of the complex analytic signal in the vicinity of the phase singularity zero and a line segment making the imaginary part of the complex analytic signal zero intersect.

* * * * *